US008696432B2

(12) United States Patent
Kane et al.

(10) Patent No.: US 8,696,432 B2
(45) Date of Patent: Apr. 15, 2014

(54) METHOD AND APPARATUS FOR CONDUCTING A GAME OF CHANCE

(75) Inventors: Steven N. Kane, Brookline, MA (US); Dow Hardy, Marlborough, MA (US); Mark E. Herrmann, Wellesley, MA (US)

(73) Assignee: Scientific Games Holdings Limited, Ballymahon, Co. Longford (IE)

( * ) Notice: Subject to any disclaimer, the term of this patent is extended or adjusted under 35 U.S.C. 154(b) by 0 days.

(21) Appl. No.: 13/286,753

(22) Filed: Nov. 1, 2011

(65) Prior Publication Data

US 2012/0108312 A1 May 3, 2012

Related U.S. Application Data

(60) Division of application No. 11/656,890, filed on Jan. 23, 2007, now Pat. No. 8,047,917, which is a continuation-in-part of application No. 11/003,016, filed on Nov. 30, 2004, now Pat. No. 7,976,374.

(60) Provisional application No. 60/569,030, filed on May 7, 2004, provisional application No. 60/761,179, filed on Jan. 23, 2006.

(51) Int. Cl.
*A63F 13/00* (2006.01)

(52) U.S. Cl.
USPC .................................. 463/17; 463/28; 463/31

(58) Field of Classification Search
USPC .................................... 463/17, 18, 22, 28, 31
See application file for complete search history.

(56) References Cited

U.S. PATENT DOCUMENTS

| | | | |
|---|---|---|---|
| 2,544,961 | A | 3/1951 | Kemp |
| 4,215,864 | A | 8/1980 | Nichols |
| 4,494,197 | A | 1/1985 | Troy et al. |
| 4,582,324 | A | 4/1986 | Koza et al. |
| 4,679,789 | A | 7/1987 | Okada |

(Continued)

FOREIGN PATENT DOCUMENTS

| | | |
|---|---|---|
| EP | 1746550 | 1/2007 |
| EP | 1762990 | 3/2007 |

(Continued)

OTHER PUBLICATIONS http://www.powerball.com/powerball/pb.sub.--howtoplay.asp, accessed Sep. 14, 2008, All.

(Continued)

*Primary Examiner* — James S McClellan
(74) *Attorney, Agent, or Firm* — Dority & Manning, P.A.

(57) ABSTRACT

A system and method are provided for playing a game of chance. The game of chance may include, for example, a lottery-type game. A result of the game of chance is revealed to a player in another medium. In one example, the result is revealed during multiple game instances of one or more online games. In one example, the online game is a game in which elements are selected, and in response to the selection, a prize is revealed (or not) to the player. In another example, the player is permitted to predict the outcome of a characteristic of the online game, a game-playing computer determines an outcome to be displayed to the player that reflects a result of the game of chance. In one example game format, the player is permitted to predict the most frequently-occurring element in a group of drawn game elements.

24 Claims, 9 Drawing Sheets

(56) References Cited

U.S. PATENT DOCUMENTS

| | | | | |
|---|---|---|---|---|
| 4,689,742 | A | 8/1987 | Troy et al. | |
| 4,725,079 | A | 2/1988 | Koza et al. | |
| 4,764,666 | A | 8/1988 | Bergeron | |
| 4,856,787 | A | 8/1989 | Itkis | |
| 4,882,473 | A | 11/1989 | Bergeron et al. | |
| 4,922,522 | A | 5/1990 | Scanlon | |
| 5,158,293 | A | 10/1992 | Mullins | |
| 5,324,035 | A | 6/1994 | Morris et al. | |
| 5,351,970 | A | 10/1994 | Fioretti | |
| 5,373,440 | A | 12/1994 | Cohen | |
| 5,377,975 | A | 1/1995 | Clapper, Jr. | |
| 5,398,932 | A | 3/1995 | Eberhardt et al. | |
| 5,429,361 | A | 7/1995 | Raven | |
| 5,518,253 | A | 5/1996 | Pocock et al. | |
| 5,569,082 | A | 10/1996 | Kaye | |
| 5,586,937 | A | 12/1996 | Menashe | |
| 5,611,729 | A | 3/1997 | Schumacher | |
| 5,628,684 | A | 5/1997 | Bouedec | |
| 5,645,485 | A | 7/1997 | Clapper, Jr. | |
| 5,653,635 | A | 8/1997 | Breeding | |
| 5,709,603 | A | 1/1998 | Kaye | |
| 5,722,891 | A | 3/1998 | Inoue | |
| 5,738,350 | A * | 4/1998 | Lai | 273/139 |
| 5,749,784 | A | 5/1998 | Clapper, Jr. | |
| 5,768,382 | A | 6/1998 | Schneier et al. | |
| 5,772,511 | A | 6/1998 | Smeltzer et al. | |
| 5,779,549 | A | 7/1998 | Walker et al. | |
| 5,788,573 | A | 8/1998 | Baerlocher et al. | |
| 5,791,990 | A | 8/1998 | Schroeder et al. | |
| 5,791,991 | A | 8/1998 | Small | |
| 5,810,664 | A | 9/1998 | Clapper, Jr. | |
| 5,816,918 | A | 10/1998 | Kelly et al. | |
| 5,823,873 | A | 10/1998 | Moody | |
| 5,823,874 | A | 10/1998 | Adams | |
| 5,830,069 | A | 11/1998 | Soltesz et al. | |
| 5,848,932 | A | 12/1998 | Adams | |
| 5,860,653 | A | 1/1999 | Jacobs | |
| 5,871,398 | A | 2/1999 | Schneier et al. | |
| 5,882,258 | A | 3/1999 | Kelly et al. | |
| 5,887,906 | A | 3/1999 | Sultan | |
| 5,928,082 | A | 7/1999 | Clapper, Jr. et al. | |
| 5,944,606 | A | 8/1999 | Gerow | |
| 5,954,582 | A | 9/1999 | Zach | |
| 5,980,385 | A | 11/1999 | Clapper | |
| 5,996,997 | A | 12/1999 | Kamille | |
| 6,007,426 | A | 12/1999 | Kelly et al. | |
| 6,012,983 | A | 1/2000 | Walker et al. | |
| 6,015,344 | A | 1/2000 | Kelly et al. | |
| 6,024,640 | A | 2/2000 | Walker et al. | |
| 6,028,920 | A | 2/2000 | Carson | |
| 6,044,135 | A | 3/2000 | Katz | |
| 6,048,269 | A | 4/2000 | Burns et al. | |
| 6,056,289 | A | 5/2000 | Clapper | |
| 6,059,289 | A | 5/2000 | Vancura | |
| 6,077,163 | A | 6/2000 | Walker et al. | |
| 6,106,393 | A | 8/2000 | Sunaga et al. | |
| 6,113,495 | A | 9/2000 | Walker et al. | |
| 6,146,272 | A | 11/2000 | Walker et al. | |
| 6,152,823 | A | 11/2000 | Lacoste et al. | |
| 6,159,097 | A | 12/2000 | Gura | |
| 6,162,121 | A | 12/2000 | Morro et al. | |
| 6,168,521 | B1 | 1/2001 | Luciano et al. | |
| 6,173,267 | B1 | 1/2001 | Cairns | |
| 6,179,711 | B1 | 1/2001 | Yoseloff | |
| 6,186,892 | B1 | 2/2001 | Frank et al. | |
| 6,203,011 | B1 | 3/2001 | Nulph et al. | |
| 6,203,427 | B1 | 3/2001 | Walker et al. | |
| 6,236,900 | B1 | 5/2001 | Geiger | |
| 6,241,606 | B1 | 6/2001 | Riendeau et al. | |
| 6,244,958 | B1 | 6/2001 | Acres et al. | |
| 6,251,017 | B1 | 6/2001 | Leason et al. | |
| 6,270,406 | B1 | 8/2001 | Sultan | |
| 6,273,817 | B1 | 8/2001 | Sultan | |
| 6,279,911 | B1 | 8/2001 | Cherry | |
| 6,280,325 | B1 | 8/2001 | Fisk | |
| RE37,371 | E | 9/2001 | Gerow | |
| 6,283,855 | B1 | 9/2001 | Bingham | |
| 6,302,793 | B1 | 10/2001 | Fertitta et al. | |
| 6,309,298 | B1 | 10/2001 | Gerow | |
| 6,311,976 | B1 | 11/2001 | Yoseloff et al. | |
| 6,312,334 | B1 | 11/2001 | Yoseloff | |
| 6,358,151 | B1 | 3/2002 | Enzminger et al. | |
| 6,364,765 | B1 | 4/2002 | Walker et al. | |
| 6,364,766 | B1 | 4/2002 | Anderson | |
| 6,368,214 | B1 | 4/2002 | Luciano | |
| 6,368,218 | B2 | 4/2002 | Angell, Jr. | |
| 6,371,852 | B1 | 4/2002 | Acres | |
| 6,375,567 | B1 | 4/2002 | Acres | |
| 6,390,921 | B1 | 5/2002 | Busch et al. | |
| 6,394,902 | B1 | 5/2002 | Glavich et al. | |
| 6,402,614 | B1 | 6/2002 | Schneier et al. | |
| 6,439,995 | B1 | 8/2002 | Hughs-Baird et al. | |
| 6,471,208 | B2 | 10/2002 | Yoseloff et al. | |
| 6,488,280 | B1 | 12/2002 | Katz et al. | |
| 6,514,144 | B2 | 2/2003 | Riendeau et al. | |
| 6,523,829 | B1 | 2/2003 | Walker et al. | |
| 6,527,175 | B1 | 3/2003 | Dietz et al. | |
| 6,540,230 | B1 | 4/2003 | Walker et al. | |
| 6,565,084 | B1 | 5/2003 | Katz et al. | |
| 6,572,106 | B2 | 6/2003 | Alexoff et al. | |
| 6,572,107 | B1 | 6/2003 | Walker et al. | |
| 6,575,832 | B1 | 6/2003 | Manfredi et al. | |
| 6,582,307 | B2 | 6/2003 | Webb | |
| 6,582,310 | B1 | 6/2003 | Walker et al. | |
| 6,588,747 | B1 | 7/2003 | Seelig | |
| 6,599,187 | B2 | 7/2003 | Gerow | |
| 6,599,192 | B1 | 7/2003 | Baerlocher et al. | |
| 6,607,439 | B2 | 8/2003 | Schneier et al. | |
| 6,612,501 | B1 | 9/2003 | Woll et al. | |
| 6,612,574 | B1 | 9/2003 | Cole et al. | |
| 6,619,660 | B2 | 9/2003 | Schaefer et al. | |
| 6,620,046 | B2 | 9/2003 | Rowe | |
| 6,625,578 | B2 | 9/2003 | Spaur et al. | |
| 6,645,074 | B2 | 11/2003 | Thomas et al. | |
| 6,645,075 | B1 | 11/2003 | Gatto | |
| 6,656,042 | B2 | 12/2003 | Reiss et al. | |
| 6,663,105 | B1 | 12/2003 | Sullivan et al. | |
| 6,676,126 | B1 | 1/2004 | Walker et al. | |
| 6,679,497 | B2 | 1/2004 | Walker et al. | |
| 6,681,995 | B2 | 1/2004 | Sukeda et al. | |
| 6,682,419 | B2 | 1/2004 | Webb et al. | |
| D486,869 | S | 2/2004 | Webb et al. | |
| 6,685,561 | B2 | 2/2004 | Anderson et al. | |
| 6,692,353 | B2 | 2/2004 | Walker et al. | |
| 6,705,944 | B2 | 3/2004 | Luciano | |
| 6,716,103 | B1 | 4/2004 | Eck et al. | |
| 6,719,631 | B1 | 4/2004 | Tulley et al. | |
| 6,729,956 | B2 | 5/2004 | Wolf et al. | |
| 6,733,385 | B1 | 5/2004 | Enzminger et al. | |
| 6,736,324 | B2 | 5/2004 | Behm | |
| 6,749,198 | B2 | 6/2004 | Katz et al. | |
| 6,761,633 | B2 | 7/2004 | Riendeau et al. | |
| 6,786,824 | B2 | 9/2004 | Cannon | |
| 6,811,484 | B2 | 11/2004 | Katz et al. | |
| 6,824,467 | B2 | 11/2004 | Schlottmann et al. | |
| 6,843,724 | B2 | 1/2005 | Walker et al. | |
| 6,852,031 | B1 | 2/2005 | Rowe et al. | |
| 6,855,052 | B2 | 2/2005 | Weiss et al. | |
| 6,896,619 | B2 | 5/2005 | Baltz | |
| 6,899,622 | B2 | 5/2005 | Lind et al. | |
| 6,910,968 | B2 | 6/2005 | Nassef et al. | |
| 6,913,534 | B2 | 7/2005 | DeFrees-Parrott et al. | |
| 6,918,589 | B2 | 7/2005 | Thibault | |
| 6,929,544 | B2 | 8/2005 | Osterer | |
| 6,934,846 | B2 | 8/2005 | Szrek | |
| 6,942,570 | B2 | 9/2005 | Schneier et al. | |
| 6,969,319 | B2 | 11/2005 | Rowe et al. | |
| 7,008,317 | B2 | 3/2006 | Cote et al. | |
| 7,008,318 | B2 | 3/2006 | Schneier et al. | |
| 7,024,375 | B2 | 4/2006 | Chau et al. | |
| 7,052,394 | B2 | 5/2006 | Walker et al. | |
| 7,073,720 | B2 | 7/2006 | Behm | |

(56) References Cited

U.S. PATENT DOCUMENTS

| | | | |
|---|---|---|---|
| 7,112,135 | B2 | 9/2006 | Anderson |
| 7,118,478 | B2 | 10/2006 | Fayter et al. |
| 7,163,459 | B2 | 1/2007 | Tanskanen et al. |
| 7,172,506 | B2 | 2/2007 | Baerlocher et al. |
| 7,179,168 | B1 | 2/2007 | Tulley et al. |
| 7,186,180 | B2 | 3/2007 | Lathrop et al. |
| 7,213,811 | B2 | 5/2007 | Bozeman |
| 7,275,990 | B2 | 10/2007 | Walker et al. |
| 7,285,045 | B2 | 10/2007 | Schneier et al. |
| 7,294,058 | B1 | 11/2007 | Slomiany et al. |
| 7,303,468 | B2 | 12/2007 | Schneier et al. |
| 7,303,470 | B2 | 12/2007 | George et al. |
| 7,311,599 | B2 | 12/2007 | Knapp |
| 7,357,393 | B2 | 4/2008 | Finocchio |
| 7,416,484 | B1 | 8/2008 | Nelson |
| 2001/0044336 | A1 | 11/2001 | Reiss et al. |
| 2001/0046891 | A1 | 11/2001 | Acres |
| 2001/0049305 | A1 | 12/2001 | Riendeau et al. |
| 2002/0010015 | A1 | 1/2002 | Acres |
| 2002/0013167 | A1 | 1/2002 | Spaur et al. |
| 2002/0039923 | A1 | 4/2002 | Cannon et al. |
| 2002/0042300 | A2 | 4/2002 | Acres et al. |
| 2002/0052229 | A1 | 5/2002 | Halliburton et al. |
| 2002/0061778 | A1 | 5/2002 | Acres |
| 2002/0077173 | A1 | 6/2002 | Luciano et al. |
| 2002/0090986 | A1 | 7/2002 | Cote et al. |
| 2002/0090987 | A1 | 7/2002 | Walker et al. |
| 2002/0093190 | A1 | 7/2002 | Katz |
| 2002/0098882 | A1 | 7/2002 | Lind et al. |
| 2002/0107072 | A1 | 8/2002 | Giobbi et al. |
| 2002/0147040 | A1 | 10/2002 | Walker et al. |
| 2002/0152120 | A1 | 10/2002 | Howington et al. |
| 2002/0155885 | A1 | 10/2002 | Shvili |
| 2002/0169018 | A1 | 11/2002 | Schneier et al. |
| 2002/0187827 | A1 | 12/2002 | Blankstein |
| 2002/0193158 | A1 | 12/2002 | Weiss et al. |
| 2002/0198038 | A1 | 12/2002 | Adams |
| 2003/0013531 | A1 | 1/2003 | Rowe et al. |
| 2003/0027628 | A1 | 2/2003 | Luciano |
| 2003/0032473 | A1 | 2/2003 | Rowe et al. |
| 2003/0032476 | A1 | 2/2003 | Walker et al. |
| 2003/0045340 | A1 | 3/2003 | Roberts |
| 2003/0047869 | A1 | 3/2003 | Walker et al. |
| 2003/0060257 | A1 | 3/2003 | Katz et al. |
| 2003/0060261 | A1 | 3/2003 | Katz et al. |
| 2003/0069068 | A1 | 4/2003 | Kaminkow |
| 2003/0080508 | A1 | 5/2003 | Thibault |
| 2003/0102625 | A1 | 6/2003 | Katz et al. |
| 2003/0114217 | A1 | 6/2003 | Walker et al. |
| 2003/0119581 | A1 | 6/2003 | Cannon et al. |
| 2003/0139214 | A1 | 7/2003 | Wolf et al. |
| 2003/0155715 | A1 | 8/2003 | Walker et al. |
| 2003/0157977 | A1 | 8/2003 | Thomas et al. |
| 2003/0171986 | A1 | 9/2003 | Itkis |
| 2003/0176210 | A1 | 9/2003 | Vancura et al. |
| 2003/0176212 | A1 | 9/2003 | Schlottmann et al. |
| 2003/0184012 | A1 | 10/2003 | Green |
| 2003/0186739 | A1 | 10/2003 | Paulsen et al. |
| 2003/0195841 | A1 | 10/2003 | Ginsberg et al. |
| 2003/0199318 | A1 | 10/2003 | Nassef et al. |
| 2003/0218303 | A1 | 11/2003 | Walker et al. |
| 2003/0220138 | A1 | 11/2003 | Walker et al. |
| 2004/0025190 | A1 | 2/2004 | McCalla et al. |
| 2004/0036212 | A1 | 2/2004 | Walker et al. |
| 2004/0038723 | A1 | 2/2004 | Schneier et al. |
| 2004/0051240 | A1 | 3/2004 | Adams |
| 2004/0053683 | A1 | 3/2004 | Hartl et al. |
| 2004/0063484 | A1 | 4/2004 | Dreaper et al. |
| 2004/0092307 | A1 | 5/2004 | George et al. |
| 2004/0102238 | A1 | 5/2004 | Taylor |
| 2004/0102239 | A1 | 5/2004 | Samila |
| 2004/0127279 | A1 | 7/2004 | Gatto et al. |
| 2004/0133472 | A1 | 7/2004 | Leason et al. |
| 2004/0142741 | A1 | 7/2004 | Walker et al. |
| 2004/0147308 | A1 | 7/2004 | Walker et al. |
| 2004/0152504 | A1 | 8/2004 | Herrmann et al. |
| 2004/0152510 | A1 | 8/2004 | Herrmann |
| 2004/0180722 | A1 | 9/2004 | Giobbi et al. |
| 2004/0185930 | A1 | 9/2004 | Thomas et al. |
| 2004/0204222 | A1 | 10/2004 | Roberts |
| 2004/0214628 | A1 | 10/2004 | Boyd et al. |
| 2004/0229671 | A1 | 11/2004 | Stronach et al. |
| 2004/0259629 | A1 | 12/2004 | Michaelson et al. |
| 2004/0259631 | A1 | 12/2004 | Katz et al. |
| 2005/0037841 | A1 | 2/2005 | de Waal |
| 2005/0049042 | A1 | 3/2005 | Walker et al. |
| 2005/0075158 | A1 | 4/2005 | Walker et al. |
| 2005/0090314 | A1 | 4/2005 | Nassef, Jr. et al. |
| 2005/0092839 | A1 | 5/2005 | Oram |
| 2005/0107153 | A1 * | 5/2005 | Jubinville et al. ............... 463/18 |
| 2005/0124407 | A1 | 6/2005 | Rowe et al. |
| 2005/0164779 | A1 | 7/2005 | Okuniewicz |
| 2005/0170881 | A1 | 8/2005 | Muskin |
| 2005/0187005 | A1 | 8/2005 | Rose et al. |
| 2005/0258596 | A1 | 11/2005 | Such |
| 2005/0282619 | A1 | 12/2005 | Vancura et al. |
| 2005/0282626 | A1 | 12/2005 | Manfredi et al. |
| 2005/0288088 | A1 | 12/2005 | Englman et al. |
| 2006/0025219 | A1 | 2/2006 | Nassef, Jr. et al. |
| 2006/0035696 | A1 | 2/2006 | Walker et al. |
| 2006/0036450 | A1 | 2/2006 | Nassef, Jr. et al. |
| 2006/0041586 | A1 | 2/2006 | Nassef, Jr. et al. |
| 2006/0068893 | A1 | 3/2006 | Jaffe et al. |
| 2006/0073884 | A1 | 4/2006 | Walker et al. |
| 2006/0089194 | A1 | 4/2006 | Joshi et al. |
| 2006/0148562 | A1 | 7/2006 | Walker et al. |
| 2006/0194631 | A1 | 8/2006 | Rowe et al. |
| 2006/0205511 | A1 | 9/2006 | Thomas et al. |
| 2006/0247035 | A1 | 11/2006 | Rowe et al. |
| 2007/0054729 | A1 | 3/2007 | Hornik et al. |
| 2007/0060261 | A1 | 3/2007 | Gomez et al. |
| 2007/0060274 | A1 | 3/2007 | Rowe et al. |
| 2007/0060317 | A1 | 3/2007 | Martin et al. |
| 2007/0060329 | A1 | 3/2007 | Martin et al. |
| 2007/0060330 | A1 | 3/2007 | Martin et al. |
| 2007/0060331 | A1 | 3/2007 | Martin et al. |
| 2007/0060369 | A1 | 3/2007 | Martin et al. |
| 2007/0087834 | A1 | 4/2007 | Moser et al. |
| 2007/0167216 | A1 | 7/2007 | Walker et al. |
| 2007/0173322 | A1 | 7/2007 | Swamy et al. |
| 2007/0265062 | A1 | 11/2007 | Thomas et al. |
| 2008/0032763 | A1 | 2/2008 | Giobbi et al. |
| 2008/0039171 | A1 | 2/2008 | Slomiany et al. |
| 2008/0039173 | A1 | 2/2008 | Walther et al. |
| 2008/0287176 | A1 | 11/2008 | Bennett |

FOREIGN PATENT DOCUMENTS

| | | |
|---|---|---|
| EP | 1833014 | 9/2007 |
| WO | WO 91/06931 | 5/1991 |
| WO | WO 97/37737 | 10/1997 |
| WO | WO 99/10057 | 3/1999 |
| WO | WO 99/16519 | 4/1999 |
| WO | WO 00/43087 | 7/2000 |
| WO | WO 00/69535 | 11/2000 |
| WO | WO 01/14029 | 3/2001 |
| WO | WO 03/004118 | 1/2003 |
| WO | WO 03/061795 | 7/2003 |
| WO | WO 03/084625 | 10/2003 |
| WO | WO 03/089077 | 10/2003 |
| WO | WO 03/089082 | 10/2003 |
| WO | WO 2004/013820 | 2/2004 |
| WO | WO 2004/114073 | 12/2004 |
| WO | WO 2005/029279 | 3/2005 |
| WO | WO 2005/031666 | 4/2005 |
| WO | WO 2005/079242 | 9/2005 |
| WO | WO 2006/028820 | 3/2006 |
| WO | WO 2006/052469 | 5/2006 |
| WO | WO 2007/035618 | 3/2007 |
| WO | WO 2007/040707 | 4/2007 |
| WO | WO 2007/076321 | 7/2007 |
| WO | WO 2007/145999 | 12/2007 |

(56) References Cited

FOREIGN PATENT DOCUMENTS

| | | |
|---|---|---|
| WO | WO 2008/014334 | 1/2008 |
| WO | WO 2008/022083 | 2/2008 |
| WO | WO 2008/022084 | 2/2008 |

OTHER PUBLICATIONS

H.X. Mel and Doris Baker, Cryptography Decrypted, 2001 Addison Wesly, chapters 9 to 12.

Virginia Lottery games, downloaded from www.archive.org, Apr. 29, 2007.

Pop Cap Games, Bejeweled, Feb. 3, 2005, http://web.archive.org/web/20050203202244/http://www.go2share.net/game/be-jeweled/index.htm.

John Scarne, Scarne's Complete Guide to Gambling, 1961, Simon & Schuster, New York, chapter 4 on lotteries, pp. 125-126.

Wikipedia, "Wheel of Fortune (US Game Show)" Wikipedia, Nov. 13, 2007 <http://en.wikipedia.org/wiki/Wheel.sub.--of .sub.--Fortune.sub.--%28US.sub.--game.sub.--show%29>.

New Jersey, State of, "Wheel of Fortune" New Jersey Lottery, Nov. 13, 2007 <http://www.state.nj.us/lottery/instant/ig409.htm>.

New Jersey, State of, "Lots O' Spots Bingo" New Jersey Lottery, Dec. 6, 2007 <http://www.state.nj.us/lottery/instant/ig340.htm>.

Rules of Pal Gow Poker. Casino City. Dec. 3, 2000. Online: http://web.archive.org/web/20001203170300/http://www.casinocity.com/rule/-paigow.htm.

* cited by examiner

METHOD AND APPARATUS FOR CONDUCTING A GAME OF CHANCE

RELATED APPLICATIONS

This application is a divisional of U.S. application Ser. No. 11/656,890, filed Jan. 23, 2007 which is a continuation-in-part of U.S. application Ser. No. 11/003,016, entitled "METHOD AND APPARATUS FOR CONDUCTING A GAME OF CHANCE," filed on Nov. 30, 2004 which claims priority under 35 U.S.C. §119(e) to U.S. Provisional Application Ser. No. 60/569,030, entitled "METHOD AND APPARATUS FOR CONDUCTING A GAME OF CHANCE," filed on May 7, 2004, which is herein incorporated by reference in its entirety. This application also claims priority under 35 U.S.C. §119(e) to U.S. Provisional Application Ser. No. 60/761,179, entitled "METHOD AND APPARATUS FOR CONDUCTING A GAME OF CHANCE," filed on Jan. 23, 2006, which is herein incorporated by reference in its entirety.

FIELD OF THE INVENTION

The field of the invention relates generally to lotteries and gaming, and more particularly, to systems for conducting lottery-based games or casino-based gaming.

BACKGROUND

There are many different types of games that are provided that involve the issuance of a lottery ticket to play a game of chance. Lottery tickets are sold through retailers using machines referred to as point of sale (POS) terminals. These tickets are generally printed at the POS terminal, and are usually issued for some lottery drawing to be performed at a later time. Examples of these types of lottery games of chance include traditional state lottery drawings and multi-state lottery drawings (e.g., PowerBall). Another type of lottery ticket, referred to in the art as instant lottery, includes a pre-printed scratch-type lottery ticket which includes a latex or similar coating that is scratched off by a purchaser (a player), revealing one or more game indicia and whether the player won the game or series of games as indicated on the ticket. The indication is generally "instant" in that the player knows, when they scratch off the ticket coating, whether or not they won the game.

There are many online games that can be played using a computer system coupled to a communication network (e.g., the Internet). These games may include traditional games of chance, games of skill, and casino-type games, among others.

Some systems combine lottery-type games and online games. In one such system, a lottery ticket is sold to a player, who then plays a further game using a computer system. In such a game system, the ticket sold to a player includes a code which is correlated to a game seed stored in a computer system upon which a computer game is played. The computer game determines the correlated game seed, and this game seed is mapped to a series of predetermined game states that lead to a predetermined outcome. That is, the code stored on the ticket includes the outcome. In another type of system, the code stored on the ticket is an encoded form of the lottery result, which is then revealed to the player at the end of play of an online game.

SUMMARY

New and more interesting game formats are needed for lottery and casino type games that keep players' interest and therefore result in continued and/or return players. According to one embodiment of the present invention, it is appreciated there is a great deal of effort and expense to introduce additional games, especially in the casino area. In particular, as each game is introduced, its features are scrutinized by regulators prior to introduction. It therefore would be beneficial to be able to reduce the regulatory effort in introducing new games that are exciting to players to play. To this end, according to one aspect of the present invention, a system is provided having two games, one of which is already approved by regulators whose outcomes are used to drive outcomes of another game. Because the outcome determination and odds of winning the other game are driven by a previously-approved game, the regulatory hurdles associated with releasing the other game are reduced.

In one aspect of the present invention, the player is permitted to play a computer-based game (referred to hereinafter as a "primary" game) during which the game playing system reveals results of another game (referred to hereinafter as a "secondary" game). This secondary game may be a casino or lottery-based game and, according to one embodiment, this secondary game is already approved by regulators. One such game is the well-known game of Keno. However, it should be appreciated that the secondary game may be any other type of game (e.g., a lottery game). The primary game may be any type of computer-based game, including games of skill and/or chance, such as card games, casino games, video games or any other type of game through which a result from another game may be revealed. In one aspect of the present invention, the play of the primary game that the player plays does not affect the outcome of the secondary game. In another aspect of the present invention, the secondary game result does not affect the outcome of the primary game played by the player.

In one example, the primary game involves some level of influence by the player on the outcome of the primary game. For instance, the primary game may be a game of skill. However, it should be appreciated that the primary game be a game based on chance, or combination of skill and chance. In one example, the primary game may be a reveal element or other representation which is activated to determine if the player wins a prize. A reveal element is an element that, when selected, indicates whether the player wins a prize (or not) with the selection of the particular element. Although the primary game is a reveal element game, the primary game may be any indication that allows a player to choose among a number of reveal elements (having associated prizes or not), and, based on a selection, reveals to the player the prize won (or not). For example, the representation may include a number of fortune cookie elements that, when selected by the player, shows any prize won associated with that fortune cookie element. However, it should be appreciated that the reveal element may be any other type of element or representation thereof.

In another game format, the player "selects" the predicted outcome of the game. Because there is some aspect of the game that the player controls (e.g., the selection of a predicted outcome), the player is provided a feeling that their selection impacts the outcome of the game. Rather, according to one embodiment, the outcome is determined independent of the player selection. For instance, the outcome may be predetermined at the Point of Sale of a ticket used to play the game, or by a later drawing (e.g., a Keno, bingo, or other type of drawing).

In one example game format, a player selects a type of game element that occurs most frequently. In one example, the game element may be a ball having a color, and the object of the game is for the player to correctly guess the most frequent color of ball (or other characteristic of any other type of element) that occurs in a set of balls. In such an example, a set of balls may be drawn, and if a player selects the most frequently occurring color prior to the drawing, the player may be indicated as winning the game. In the case where the player's selection does not impact the outcome of the game, the player may select whatever balls the player chooses, and the drawn balls are determined (e.g., by a game-playing computer) so that the predetermined outcome can be revealed to the player. In this way, the player may be provided the feeling that their selection impacts the outcome of the game, even though the result is determined so that the predetermined outcome may be displayed. According to another aspect, the player may be permitted to predict any other type of game play characteristic to which the game-playing computer can provide a game result that enables a reveal of the predetermined outcome. Such an outcome may be determined at any time, but, according to one embodiment, the predetermined outcome is determined prior to play of the computer-based game.

In another example game format, a player may be presented a set of elements, and the player is permitted to select any number of elements until they receive a predetermined number of matching elements. Each element may correspond to a prize (or not), and the identity of the element type is hidden from the player until the element is selected. The player continues selecting elements, and when the player selects the predetermined number of a particular element, the player wins the prize indicated. In one such game format, the player selects a bottle element from a group of bottles, and when the bottle is selected, a game-playing computer system reveals a potential prize. The player continues to select bottles until three or any other predetermined number of the same type of prize is revealed. In one example game format, the player "shoots" bottles positioned on a group of shelves.

In another example game format, when each bottle (or other type) of element is selected, an icon or other indicia is revealed. The icon, if combined with other icons (either the same icons or combination of different icons), matches an entry of a paytable, the player wins the corresponding prize indicated by the paytable entry.

According to one aspect of the present invention, the result of the primary game is stored on a server coupled to a computer system upon which the game is played. In one example, the result is downloaded to the computer system prior to game play. The result may be in the form of intermediate results of each game instance that are displayed to the player at various points during game play. For instance, intermediate results may be displayed to a user during an instance of reveal element game. In the case of a reveal element game, a player may be permitted to select multiple reveal elements to reveal one or more intermediate results.

In one embodiment of the present invention, a reveal element game is used to reveal results of a secondary game (e.g., a lottery or casino-type game). For instance, prizes are awarded during one or more instances of a reveal element game. According to one embodiment, the player is provided a predetermined number of opportunities to win associated with a ticket. When a ticket is issued, the ticket may be assigned, for example, a number of game instances. Such game instances may be, for example, instances of a reveal element game. Within each game instance, there may be one or more win opportunities. After each game instance is played, prizes associated with the secondary game (e.g., a lottery or casino-type game) may be revealed.

Prizes revealed may be, for example, a cash prize awarded for a particular game. It should be appreciated, however, that other prizes may be awarded (e.g., merchandise, credit, free reveal element selection, etc.) and that the invention is not limited to any particular prize type.

According to one aspect of the present invention, prizes revealed during the game may be stored in a database of the server and downloaded to the client prior to play. In this example, the player may be allowed, when a ticket is purchased at a POS, the ability to play a number of instances of the game. Prizes may be awarded, for example, at each instance of the online game. To this end, the result of each prize may be stored in the database of the server, and may be indexed by an identifier of the ticket. For example, the identifier may be a serial number or other ticket-identifying information.

According to one aspect of the present invention, prizes are only awarded at the end of each game instance. In another example, after a prize is revealed (or not) at the end of each game instance, the player is permitted to play any remaining instances of the primary game (e.g., a reveal element game or other game). According to another embodiment, the player may not be permitted to replay game instances after they have been played. To this end, a game-playing system may maintain a status of the game instances played by the player. The game-playing system may maintain other information, such as game play information, how prizes are revealed to the player, and other information that may be useful for assessing or auditing game play and playing experiences of the player.

Each instance of the game may include an associated prize (or not), and these prizes may be combined for an overall prize associated with the ticket. In one example, the prize associated with the first instance of the reveal element game is $10. A prize associated with a second instance of the reveal element game is $15. The prizes associated with each instance of the reveal element game and its second level may be stored as an entry in the database of the server.

Alternatively, the result of each prize for each instance of the game may be determined dynamically by the client computer. For example, if the overall prize (e.g., $25) for the ticket is known, the client can determine (e.g., randomly) a distribution of winnings of the overall prize among game instances. In the example above, a play of the ticket on one computer could award a $25 prize among two game instances as follows: $5 prize for the first game instance and $20 for the second game instance. Another play of the ticket on the same or different computer may award a $25 prize differently among the two game instances (e.g., $10 for the first game instance, $15 for the second game instance, etc.). It should be appreciated, however, that the game may include any number of game instances, and the prize associated with each game instance may be stored in any storage location (e.g., at the client computer, at the server, etc.).

In another example system, prizes may be awarded in association with elements selected in the game (e.g., a reveal element in a reveal element game). Therefore, prizes may be distributed among elements as well as being distributed among game instances. As discussed, prize distribution may be stored in a database of the server, may be determined by the client (e.g., randomly), or may be stored at any location or be determined by any mariner by the client.

In another embodiment, a reveal element game may be combined with another game. This game may be a game for amusement only, which keeps the player's interest after it is determined that the player does not win a prize. For instance, in the case of a reveal element game having a reveal element that indicates the player does not win a prize, a second level game for amusement may be started when the reveal element is selected by the player. In this manner, a player receives something from losing the game (or, losing a particular game instance, opening a losing reveal element, etc.), and there is an increased participation in the game as a result. Traditionally, players are provided incentives to win games, not to lose them. According to one embodiment, losing players are provided an enhanced game experience to encourage repeat play of the game, or to encourage continued participation within the same game.

The second level game may be, for example, a fortune game. In one example, each of the reveal elements has a prize, or alternatively, a fortune associated with the reveal element. If, when selected, the reveal element does not win the player a prize, the player is shown a fortune that is associated with the losing reveal element.

In one example, a reveal game is provided that allows permitting selection, by a player, of a number of reveal elements among a group of reveal elements displayed to the player. One or more of the reveal elements in the group of reveal elements may have prizes associated with them, some of them may have a second level game (e.g., a fortune game) associated with them. For instance, a selection of a first reveal element may reveal a nominal prize, and two additional reveal elements may reveal fortunes associated with these reveal elements. Selection of another reveal element may win a player another prize. Because the second level game keeps player interest, more flexibility is provided to the game programmer for scripting the outcomes of games. More particularly, the secondary game may be used as bridge between prize reveals to maintain player interest. Fortune information associated with the second level game may be stored, for example, in a database of a game server. Content of the fortune game may be updated frequently to provide a more interesting game experience.

According to another aspect of the present invention, an improved game experience is provided for revealing the result of an online game. As discussed above, a player purchases a ticket or other game piece at a POS or other location. On the ticket, multiple plays of an associated online game are provided with each ticket or other game piece. The player can play those multiple plays across a set of games. For instance, the set of games may include, for example, games of skill and/or chance as discussed above. Certain games may include one or more attempts (or opportunities) for winning prizes. These opportunities for winning may be associated with one or more prizes. For example, a player playing a slot machine may be awarded a certain number of opportunities to play a game (e.g., a game instance (or game play) or other opportunity to win a prize when playing a particular game instance). In the case of a reveal element game, the player may be provided a particular number of selection of a particular reveal element in a reveal element game (or multiple reveal element game instances having one or more selections of reveal elements), and, as a result of each reveal element selection, the player may be awarded (or not) a prize. In one embodiment, the result of the overall game is predetermined, and a game experience is determined for each opportunity (e.g., reveal element selection, reveal element game instance) that results in a contribution to the result of the overall game.

According to one embodiment of the present invention, the type of game that is played is immaterial to the outcome revealed to the player. More particularly, the same outcomes associated with a particular ticket may be used to drive multiple types of games. This allows, for example, the gaming operator to offer multiple types of games with a single ticket, and allows the player to select which game(s) to play to reveal the outcomes associated with the particular ticket. For instance, the player may elect to play a reveal element game for a first game instance of a ticket, and for a second instance, play a different game. Of course, it should be appreciated that any type of game and other combinations of games are possible. In this manner, the player may be provided the flexibility to play particular games in which the player is interested, thereby increasing his/her interest and participation in the game. Further, the game operator is provided additional flexibility as new games may be introduced/substituted that are associated with the same ticket or other game piece.

According to one embodiment of the present invention, the outcome of the game is predetermined at the time of ticket printing, issuance, or purchase or shortly thereafter. That is, the game outcome associated with a particular ticket is available prior to, at the same time, or shortly thereafter the ticket is provided to the player, after which time the player is permitted to play any games to reveal the predetermined outcome. In another embodiment, outcomes associated with tickets issued to the player are determined some time after the ticket issuance (i.e., outcomes are "post-determined"). Such is the case with Keno or other drawing-based games wherein game outcomes are determined after ticket issuance. In such a game, players are permitted to obtain the outcome at a predetermined time, usually after the player has purchased the ticket. In one aspect of the invention, it may be beneficial to have a later activation of tickets, especially in the case of a ticket-based game where tickets are issued in some other gaming environment (e.g., a casino). It may be desirable to only permit the player to play such a game outside the gaming environment so as not to compete with other games. Additionally, it may be desirable to require the player to revisit the gaming environment to redeem the ticket and increase the chances that the player will purchase additional tickets or play other types of games offered in the gaming environment.

Also, according to another aspect of the present invention, a first game may be used to reveal the result of a second game. As discussed above, this second game may be one which is already approved by regulators. Such a system may be, for example, a game whose results are driven by a random number generator (or RNG as referred to in the art). One such game is the well-known game of Keno. Another game that may be used is the well-known game of bingo. Other games may be used to drive the outcome of an online game.

In one example, a Keno game and its associated system are used to generate reveal results which are revealed to a player during play of an online game. To this end, a Keno-based system may be used in conjunction with an online gaming system to present new and interesting online games whose outcomes are driven by results provided by the Keno system. In one particular example, a Keno system provides a correlation of a ticket identifier to a Keno game which is held at some predetermined time. As the Keno numbers are drawn, an outcome is produced associated with the particular ticket identifier and provided to an online gaming system. The online gaming system uses the produced outcome to render a new and interesting gaming experience within an online gaming environment. As discussed, such an environment may include online play of one or more online games of skill, chance, or combination thereof.

According to one embodiment of the present invention, wins are optimized across game instances associated with a ticket. For instance, a ticket may have a predetermined outcome (for example, awarding a prize of $50), that may be allocated across the game instances associated with that ticket. For example, in the case of winning $50 on a 5-play (5 game instances) ticket, it may be desired to allocate the wins across game instances to provide a particular game experience. For instance, the game experience of winning $50 may be distributed across five game instances (e.g., five separate games, respectively winning $5, $0, $0, $5, $40) to provide the player an early indication of winning. In the example of a reveal element game, winnings may be distributed among consecutive selections of reveal elements. Also, the remaining game play of the game instances may be scripted to build the drama of the game experience while still retaining player interest. Such a scripted outcome is more interesting, according to one embodiment, as the player is presented an outcome in a way such that retains interest in the game. This is beneficial, as an overall result includes extending scratch-type games or other type of game experience beyond the point of sale, and beyond the instant (but fleeting) gratification associated with scratch-type or other instant ticket game experiences.

According to one embodiment, a player is permitted to wager and redeem bets at authorized locations (e.g., legal jurisdictions such as lottery retail establishments, casinos, and the like) while the online portion of the game may be played in any locale or jurisdiction. In such a case, the casino or lottery experience is extended to locations where otherwise lottery and/or casino games are not available. Thereafter, players return to the lottery or casino establishment to redeem their tickets thereby providing yet another opportunity to entertain the player.

According to yet another aspect of the present invention, winning results may be split across opportunities to win. One embodiment of the present invention relates generally to how wins are shown to the player across win opportunities. In one specific example, one embodiment relates to a method for revealing wins to a player across a play of multiple game instances that build excitement for the player and which holds the interest of the player in continuing to play the game. It is appreciated that the game experience may be made more compelling if wins are distributed among win opportunities in an interesting way.

Another method for maintaining the interest of players includes awarding additional opportunities to win with each ticket. For instance, one of the prizes awarded with a particular opportunity to win (e.g., during the play of the game instance) may be one or more additional opportunities to win. For instance, in a reveal element game, an issued ticket may be associated with seven (7) selections of a reveal element within five (5) game instances of a reveal game. One of the prizes awarded with the ticket may include additional game instances. At the time of initial ticket activation, it may be predetermined that the ticket is associated with these additional opportunities to win, and these additional opportunities may be associated with the issued ticket (and distributed among game instances, reveal elements, or other opportunities to win). The player, when playing the game, will obtain additional satisfaction in playing because the number of game instances to be played by the player are increased, and therefore, their opportunity to win is also increased. This may be beneficial to create a more realistic gaming experience where additional games may be awarded during play. However, unlike in other environments (e.g., a casino) wherein play can be continued from an online account or by placing additional bets to create a more continuous game experience, the additional win opportunities are awarded to a single ticket.

In the case where an online game system is a Keno-based or other drawing-based systems wherein results are not predetermined, additional opportunities to win may be associated with the ticket in the form of additional numbers selected by a computer system and associated with the ticket at the time of a drawing. This may be performed, for example, by assigning one or more additional drawing entries as a prize itself in the pay table associated with the Keno or other drawing-based game. More particularly, the drawing entries may be awarded as prizes, which themselves are indexes into other entries in the same pay table. Such additional entries may correspond to one or more prizes. For example, when the drawing occurs, the additional plays are awarded to the drawing numbers associated with the ticket. These drawing numbers may be associated with a particular game instance, of which there may be many associated with one ticket. At the point when the ticket is activated by the result of the drawing and play of the online game is permitted, the player, upon the beginning of play of the ticket or a particular game instance, the player is awarded the additional plays (and therefore, any prizes) associated with these additional plays. The additional plays may be played as additional game instances, which themselves have additional reveal opportunities. Alternatively, additional reveal opportunities may be added to one or more other game instances to make game play more exciting.

According to another aspect of the present invention, a method is presented for providing players an enhanced gaming experience. According to one embodiment, it is appreciated that it is beneficial to enhance players' interest in playing games, particularly losing ones. In one embodiment, an illusion is presented to players to provide the illusion of being very close to winning a particular game. For instance, in the case of a reveal element game, the reveal element game result may indicate, that the player received a result that was close to winning (e.g., the reveal element game does not award prizes, but otherwise indicates that the player is close to winning or is a "lucky" player), and only with the selection of the last reveal element does the player realize that he/she has lost the game. According to one aspect, it is realized that the losing game experience should compel the player to continue playing the game.

In another example system, prizes may be awarded in association with each item collected in the game (e.g., number of points achieved in a slot machine type game, achieving a particular outcome in a reveal element game). Therefore, prizes may be distributed among elements or levels during play as well as being distributed among game instances. As discussed, prize distribution may be stored in a database of the server, may be determined by the client (e.g., randomly), or may be stored at any location or be determined by any manner by the client.

According to another aspect of the invention, it is appreciated that conventional methods for playing online games of chance are not secure. In particular, because the result or outcome of the game or predetermined sequence of game states may be encoded on a ticket, the lottery game may be compromised if the winning codes are deciphered. Such a deciphering could occur, for example, by hacking a computer system associated with the online lottery and obtaining a list of winning tickets, or reverse engineering software (e.g., on a PC) where the winning codes or sequence of game states may be stored. Further, it is realized that in such conventional systems, the lottery ticket or the online game software and its data are single points of security failures in the system.

One aspect of the present invention relates to a method for conducting a game of chance. According to one embodiment, a more secure method is provided by which an online game may be played. Instead of placing a game seed that determines a sequence of game states on a ticket (e.g., an instant scratch or lottery ticket), the game states or outcomes may not be placed on the ticket. Rather, the outcomes may be stored in an online database. To this end, a code may be stored on the ticket, the code being used as a decryption key used to find the outcome stored in the database. In particular, there may be a mapping between an outcome code and a corresponding decryption key that is printed on the ticket.

Because the decryption key is placed on the ticket, unauthorized access to the online game is not permitted without the physical ticket. In another embodiment, a portion of the decryption key is placed on the ticket, and another portion is stored in a database associated with the online game. In this manner, security cannot be breached without having both portions of the key (either having the issued ticket portion or the online portion). Thus, a hacker may not compromise a lottery ticket database without the ticket, and, by virtue of having a winning ticket, other winning ticket numbers may not be determined. Access to the online portion of the key may be obtained, for example, by providing some other information (e.g., a serial number printed on the ticket). However, it should be appreciated that the information used to gain access to the online portion of the key need not be printed on the ticket—the information may be provided on some other medium or by another method.

The ticket may be, for example, a scratch-type lottery or "instant" ticket, pull-tab, or type of pre-printed ticket type. Alternatively, the ticket may be a printed lottery ticket as is known in the art, which is a ticket printed at a Point of Sale (POS), usually in the form of a lottery drawing ticket (e.g., PowerBall or other type lottery drawing game). Also, the ticket may be an electronic ticket issued by a computer system. It should be appreciated that the ticket may be any type of ticket issued in any form, and the invention is not limited to any particular ticket type method of issuing a ticket.

According to one aspect of the present invention, a method for playing a game of chance is provided. The method comprises acts of issuing a ticket to a player, the ticket including a code printed on a surface of the ticket, and providing for the player to play a game on different medium than the issued ticket, wherein the code is used to gain access to obtain at least one result of the game of chance, and wherein the act of providing includes acts of permitting the player to select at least one game element, and displaying, to the player in response to the selection, the at least one result of the game of chance. According to one embodiment of the invention, the method further comprises an act of revealing the at least one result of the game of chance independent of the selection of the at least one game element. According to another embodiment, the at least one result is determined at a Point of Sale (POS) of the issued ticket. According to another embodiment, the at least one result is determined prior to play of the game on the different medium. According to another embodiment, the act of issuing a ticket includes issuing at least one of a lottery ticket, a printed ticket, a scratch ticket, and a pull-tab ticket.

According to one embodiment of the invention, the act of providing further comprises an act of providing a computer-based game which the player plays the game to reveal the at least one result of the game of chance. According to another embodiment, the act of providing a computer-based game further comprises an act of permitting access to the at least one result of the game of chance by using the code as a decryption key to obtain the at least one result. According to another embodiment, the method further comprises an act of storing, on a server, the at least one result of the game of chance. According to another embodiment, the method further comprises storing, in a database of a computer system, a portion of an decryption key, the portion being used along with the code by the computer system to obtain the at least one result. According to another embodiment, the act of providing includes an act of permitting access to a website to play the game. According to another embodiment, the method further comprises an act of obtaining, from the database of the computer system, the portion of the decryption key based on an identifier printed on the ticket.

According to one embodiment of the invention, the identifier is a serial number associated with the ticket. According to another embodiment, the method further comprises an act of presenting, to the player, an interface in which the player is permitted to enter the code to obtain security access to the at least one result. According to another embodiment, the game is a game of chance. According to another embodiment, a selection of at least one reveal element in the game is determined by a random number generator. According to another embodiment, the game is a computer-based game including a reveal element that, when selected by the player, causes a game-playing computer to display one or more prizes awarded to the player. According to another embodiment, the method further comprises an act of providing a pay table, the pay table having a plurality of entries distributed among one or more reveal elements. According to another embodiment, a prize total associated with the ticket is predetermined.

According to one embodiment of the invention, a sequence of results revealed to the player is predetermined. According to another embodiment, a sequence of results revealed to the player is randomly determined by the client. According to another embodiment, the sequence of results is stored in a database of a server. According to another embodiment, the plurality of entries of the pay table are distributed among a plurality of instances of the game. According to another embodiment, the method further comprises an act of increasing a value of available prizes distributed to later instances of the game. According to another embodiment, the result of the at least one reveal element selection in the game reveals a prize won by the player. According to another embodiment, an indication of the prize won by the player is stored in a database of a server, and is downloaded to a computer presenting the computer-based game to the player. According to another embodiment, the method further comprises an act of providing, by a first server associated with a first game, the at least one result associated with the game of chance.

According to one embodiment of the invention, the method further comprises an act of storing, in a memory of a computer system, the at least one result associated with the game of chance. According to another embodiment, the method further comprises an act of associating the at least one result with an indication of the ticket. According to another embodiment, the indication of the ticket is unique among indicators of a plurality of tickets. According to another embodiment, the first server further comprises a random number generator, and the random number generator performs an act of determining a set numbers associated with the issued ticket. According to another embodiment, the method further comprises an act of determining a set of winning numbers associated with the game of chance. According to another embodiment, the method further comprises an act of determining the result of the game of chance based on a comparison of the set of numbers associated with the issued ticket and the set of winning numbers.

According to one embodiment of the invention, the game of chance includes at least one of a Keno game and a bingo game, and the act of determining a set of numbers associated with the issued ticket comprises an act of selecting a predetermined number of numbers from a predetermined set of numbers. According to another embodiment, the method further comprises an act of permitting the player to redeem the issued ticket without playing the game on the different medium. According to another embodiment, the sequence of reveals is determined dynamically by a game playing computer system. According to another embodiment, the player must wait until a specific event has been completed before gaining access to obtain the at least one result associated with the ticket. According to another embodiment, the issued ticket discloses the number of game instances awarded the player. According to another embodiment, a prize total associated with the ticket is determined after the ticket is issued to the player. According to another embodiment, the method further comprises an act of determining an outcome associated with the ticket based on a drawing. According to another embodiment, the method further comprises an act of permitting the player to play the game in response to the act of determining the outcome. According to another embodiment, a prize total associated with the ticket is determined prior to issuing the ticket to the player.

According to another aspect of the present invention, a method for playing a game of chance is provided. The method comprises acts of issuing a ticket to a player, the ticket including a code printed on a surface of the ticket, and providing for the player to play a game on different medium than the issued ticket, wherein the code is used to gain access to obtain at least one result of the game of chance, and wherein the act of providing includes acts of permitting the player to predict a result of at least one game element, and displaying, to the player in response to the prediction, the at least one result of the game of chance. According to one embodiment of the invention, the method further comprises an act of determining a game outcome that corresponds to the at least one result of the game of chance. According to another embodiment, the act of permitting includes an act of permitting the player to predict a result of a drawing of a plurality of game elements. According to another embodiment, the act of permitting the player to predict a result of a drawing of a plurality of game elements includes an act of permitting the player to predict a most frequently drawn game element type of the plurality of drawn game elements. According to another embodiment, the plurality of drawn game elements includes a plurality of drawn balls, and the method further comprises an act of permitting the player to predict the most frequently drawn game element type based on indicia associated with a ball element.

According to one embodiment of the invention, the indicia includes at least one of the group comprising color, size, shape, and characteristic. According to another embodiment, the method further comprises an act of determining the drawing of the plurality of game elements that corresponds to the at least one result. According to another embodiment, the act of permitting the player to predict a result of at least one game element includes an act of permitting the player to predict a result of a drawing of the at least one game element. According to another embodiment, the method further comprises an act of storing, on a server, the at least one result of the game of chance. According to another embodiment, a prize total associated with the ticket is determined after the ticket is issued to the player. According to another embodiment, the method further comprises an act of determining an outcome associated with the ticket based on a drawing. According to another embodiment, the method further comprises an act of permitting the player to play the game in response to the act of determining the outcome.

According to one embodiment of the invention, a prize total associated with the ticket is determined prior to issuing the ticket to the player. According to another embodiment, the act of issuing a ticket includes issuing at least one of a lottery ticket, a printed ticket, a scratch ticket, and a pull-tab ticket. According to another embodiment, the act of providing further comprises an act of providing a computer-based game which the player plays the game to reveal the at least one result of the game of chance. According to another embodiment, a selection of at least one reveal element in the game is determined by a random number generator. According to another embodiment, the game is a computer-based game including a reveal element that, when selected by the player, causes a game-playing computer to display one or more prizes awarded to the player. According to another embodiment, the method further comprises an act of providing a pay table, the pay table having a plurality of entries distributed among one or more reveal elements. According to another embodiment, a prize total associated with the ticket is predetermined.

According to one embodiment of the invention, a sequence of results revealed to the player is predetermined. According to another embodiment, a sequence of results revealed to the player is randomly determined by the client. According to another embodiment, the sequence of results is stored in a database of a server. According to another embodiment, the plurality of entries of the pay table are distributed among a plurality of instances of the game. According to another embodiment, the result of the at least one reveal element selection in the game reveals a prize won by the player.

Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 2:
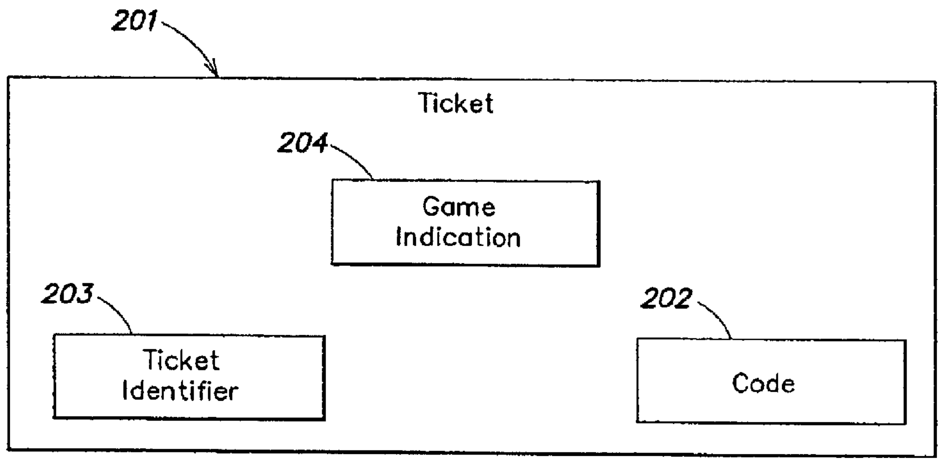
FIG. 2 is an example ticket that may be issued in association with a game according to one embodiment of the present invention.

FIG. 2 shows an example ticket 201 that may be issued to a player. The player may scratch a surface of the ticket (in the case of a scratch ticket) to reveal one or more indications. These indications may include, for example, a serial number of the ticket, an access code, or other indication (or combination thereof) that may be used to access the online game.

Alternatively, the ticket may be a pull-tab ticket or other ticket type suitable for presenting indications to a player.

The ticket may include other indications (e.g., a decryption key or portion thereof as described above that may be used to decrypt game results). Also, the ticket may indicate to a player the number of plays of a second game (e.g., as played by the player on a computer system). For instance, in the case of a slot machine game, the ticket may indicate the number of spins that a player may be awarded by the ticket. Further, as discussed above, the player may be permitted to play any one of a number of offered games, and the player may select different games to play to reveal results associated with game instances.

In one embodiment, ticket 201 includes a code 202 printed on a surface of the ticket that provides access to outcomes (e.g., prizes) stored on the server. As discussed, code 202 may also include, as an optional feature to increase security, a key that may be used to decrypt the outcome. This outcome may be stored in a database stored on a server system. Ticket 201 may also include a ticket identifier 203 used to identify the ticket, and which may be used to identify the outcome associated with the ticket. Further, ticket 201 may include a game indication 204 that relates information relevant to a game played on a computer system. For example, there may also be stored, on the ticket, an identifier that indicates, to the player, the number of plays associated with an online game. In one example, a player purchases a ticket at a retailer or other POS location.

Figure 1:
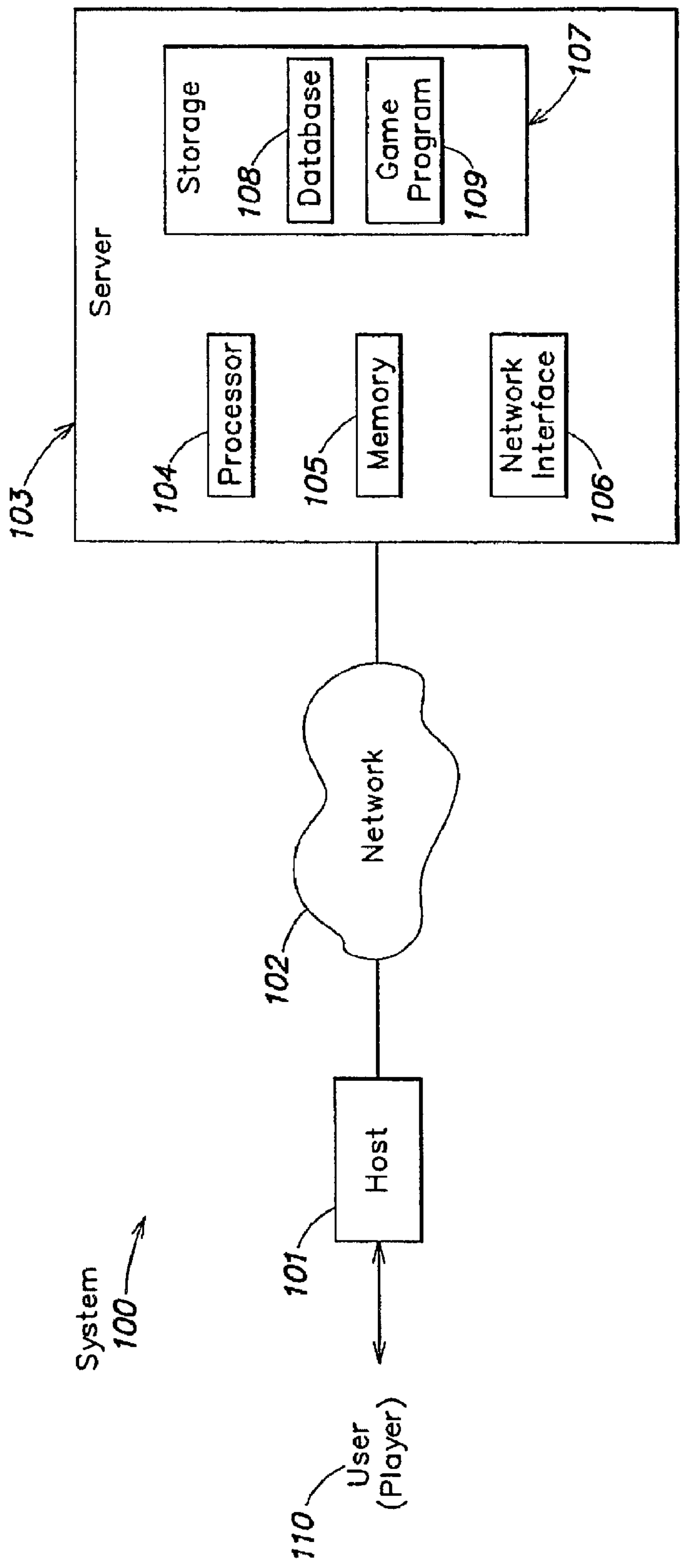
FIG. 1 is block diagram of a system for conducting a game according to one embodiment of the present invention.

The player then proceeds to play a game on a computer system. FIG. 1 shows an example system 100 according to one embodiment of the invention upon which a game may be played. The user (a player) 110 plays a game through an interface of a host computer system (e.g. host 101). Host 101 may be any type of computer system that is capable of playing a game. The host may be, for example, a general-purpose computer system (e.g., a personal computer (PC)) that connects to a network (e.g., the Internet). Other general purpose computer system types (e.g., a PDA, a cell phone, set-top box, or other system type) may be used to play the game.

The computer system may be coupled to a server system 103 through one or more communication networks 102. The server may provide a game program 109 that is executed by host 101 for playing the game. More particularly, game program 109, when executed, may provide an online game that can be played by a user through an interface associated with host 101. This online game may be, for example, a video slot machine, blackjack, or other online or casino-type game.

The game program may be stored, for example, in a computer-readable medium (e.g., a memory, storage, or other media) associated with server 103 that provides game programs. For instance, the game program may be stored on a web server and downloaded to a client computer over the Internet. Game program 109 may be one of a number of game programs associated with an online game experience. Different game programs may be selectively downloaded to the client, based on the type of game ticket issued, the game selected for play by the user, the type of client used, or other criteria.

Server 103 may also be a general-purpose computer system, or any other type of computer system capable of authenticating tickets, providing game programs, and performing other game-related functions. Further, it should be appreciated that various game functions may be performed by one or more server systems. Server 103 generally includes a processor 104 for executing server-based game functions. Server 103 may also include a memory 105 for storing data associated with game programs. Server 103 may also include one or more network interfaces 106 that couple server 103 to network 102, which permit server 103 to communicate with one or more hosts. Further, server 103 may include one or more storage entities 107, including disks or other media for storing data. In one embodiment, storage 107 is adapted to store one or more game programs 109 as discussed above. Server 103 may have any number or type of processor that executes an operating system and one or more application programs. In one embodiment, server 103 provides web server content to one or more clients for the purpose of accessing and playing the game.

Server 103 may also include a database 108 that is adapted to store one or more outcomes associated with a ticket or other gaining piece. As discussed, the outcome may be indexed using an identifier of the ticket.

Figure 3:
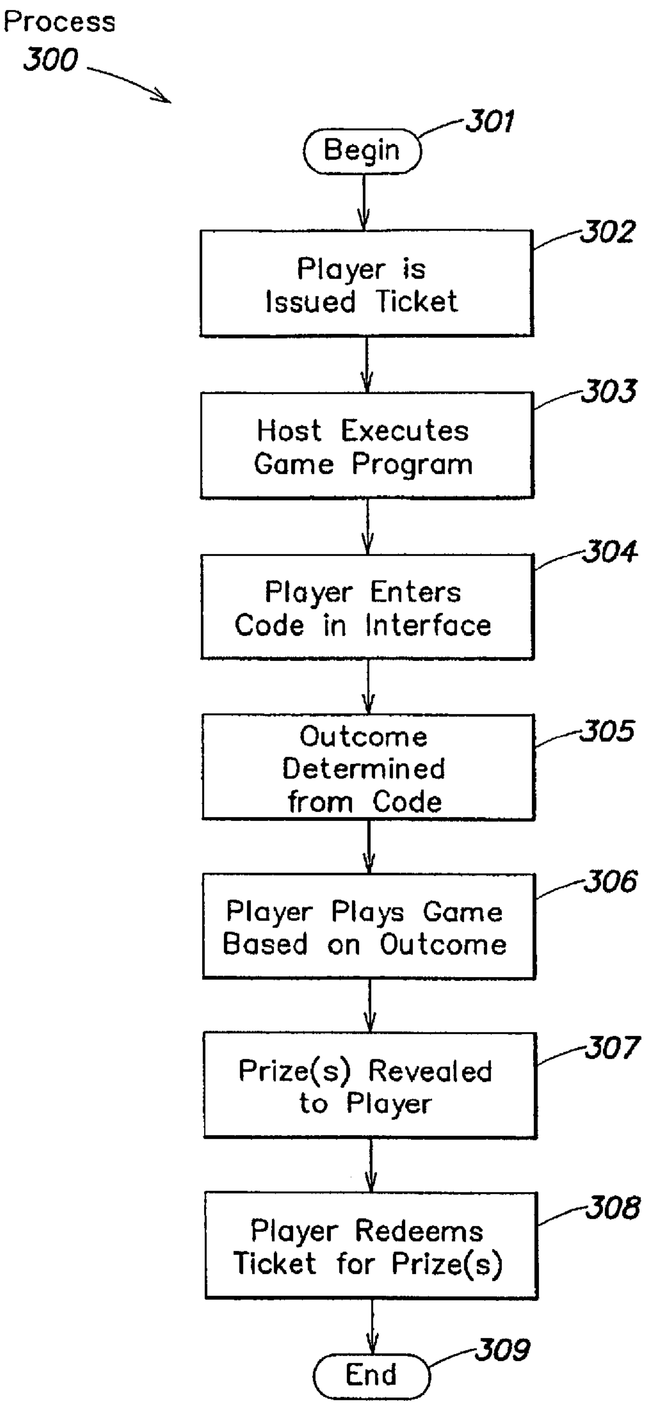
FIG. 3 is a flow chart of a process for conducting a game according to one embodiment of the present invention.

FIG. 3 shows one example process for conducting a game according to one embodiment of the present invention. At block 301, process 300 begins. At block 302, a player is issued a ticket. As discussed, a player may purchase a ticket at a retailer or other POS location. At some later time and/or location, the player may play an online game on one or more computer systems (e.g., a PC or other computer system capable of playing games). For instance, at block 303, a host computer system (e.g., host 101) executes a game program. The game program may be, for example, an online game that includes one or more components downloaded over a communication network (e.g., the Internet).

As discussed, the ticket may include a code which is used to access the outcome of a game. This code may be printed on a face of the ticket as discussed above with reference to FIG. 2. In one example system, the player accesses a website that includes an interface in which the player may enter the code at block 304.

This interface may be, for example, used to access the game, or may be any other interface (e.g., an interface used to access a download website used for downloading game software (e.g., game program 109)). The interface may be programmed in one or more computer languages (e.g., an HTML, Java, Macromedia Flash, or other type interface) and may include a text entry box in which the player can input the code. The interface may include other ways of entering a code or other parameter (e.g., a glyph printed on a ticket) that allows the user to gain access to the game. It should be appreciated that the invention is not limited to any particular method for entering the code, or any format of the code, and that any type of code or method of entry may be used.

The player enters the code, and an outcome is determined at block 305 based on the code. More particularly, there may be a mapping between the code printed on the ticket and an outcome stored cm the server. This code may be stored, for example, in a database structure stored in database 108 of the server. Database 108 may be, for example, a relational database, object database, flat file database, or other organizational entities used to store and maintain data. Further a listing of winning codes may be furnished to an organization that provides the game (such as, for example, a state-run lottery commission). The code may, as discussed above, include an optional decryption key that decrypts an entry stored on the server. This entry may indicate one or more outcomes of game instances.

The outcome of the game is then used by the online game to determine play of the game by the player at block 306. For instance, if the stored outcome is "Win $50," the online game may present an outcome to the player that indicates that the player won a $50 prize. This presentation may be in the form of one or more reveals presented to the player while playing the online game at block 307. The presentation may be progressive, in that the ultimate outcome (e.g., "Win $50") is achieved through a set of reveals or progressions through the online game. For example, in the case where a reveal element game is played wherein outcomes are revealed during the play of one or more reveal element game instances, reveal element selections, etc., such reveal outcomes presented during the game associated with each reveal element game instance may be stored on the server.

As discussed, prizes may be distributed over game instances and/or items (or more generally, win opportunities) to maximize game interest and to entice the player to play each game instance associated with a particular ticket. For example, one approach may include providing to the player an early (relative in the series of game instances) indication of winning to keep the player interested. As the player plays more game instances, the magnitude of the prizes may be adjusted such that a level of game "drama" is increased. That is, prize values are adjusted among later game instances to provide relatively higher prize values in later games. Other approaches/distributions may be provided for increasing or maintaining game interest.

Once played, the player may redeem the ticket at the point of sale or other redemption location at block 308. Alternatively, the player may be permitted to redeem the ticket without playing the game. Redemption may be permitted, for example, after a predetermined time. For instance, the player may be permitted to redeem a ticket after a set time (e.g., 10 PM), a particular time period after ticket purchase (e.g., 24 hours) or other absolute or relative time. This may be the case for a Keno or lottery-based system, where a Keno or lottery result is made available at a set time after ticket purchase. Alternatively, tickets may be redeemed immediately after purchase. At block 309, process 300 ends.

Payouts may be determined by a pay table associated with the game. The number of tickets may be determined a priori, and a pay table that determines payouts may be allocated to the tickets. This allocation may be determined, for example, by shuffling the pay table and allocating results to tickets. The following is an example of a pay table that may be used with a game according to one embodiment of the invention:

Number of Tickets Issued: 2000

Ticket Price: $5

TABLE I

Example Payout Table

| Number of Tickets | Payout |
|---|---|
| 1 | $100 |
| 700 | $10 |
| 500 | $5 |
| 100 | $1 |
| 600 | $0 |

Game Operator Return: $300 (3%)—Expenses

As shown in the example above, a certain number of tickets may be allocated as winning tickets having a particular payout (e.g., an outcome). Some tickets may have no payout associated with them, and some may only have a nominal payout (e.g., a small award amount, free ticket, etc.). A small number of tickets may include a large payout as compared to the magnitude of other payouts. It should be appreciated, however, that payouts are not limited to money, but other types of prizes may be awarded including merchandise, credit, loyalty points or any other representation of value.

The odds of winning may be the type of odds experienced in actual (rather than computer-based) games. Alternatively, the odds of winning may not necessarily be "natural" odds of winning any particular type of game, but rather, the odds may be adjusted to obtain the outcome desired (e.g., by the gaming operator). The odds of winning, number of winning tickets, amount of payout per ticket, or other payout parameter may be any amount or number, and the invention is not limited to any particular odds of winning, number of winning tickets, payout amount or type of payout. However, according to one embodiment, the overall odds of winning, amount and type of payout, etc. may be similar to a game previously approved by regulators (e.g., state lottery scratch ticket games, Keno, bingo, etc.) so that the use of an additional game to display an outcome associated with the previously-approved game is scrutinized much less by regulators, and as a result, the approval of the additional game is less burdensome. To this end, a system associated with the previously-approved game may provide ticket and outcome information to a system conducting an online game (e.g. server 103).

The code stored on the server (e.g., server 103) may be used to determine game play as played on the computer system. For instance, the game outcome may be "Win $50," In the case of a reveal element game, the ticket may indicate that the player receives seven (7) selections of a reveal element among a group of presented reveal elements. For instance, the reveal elements may be representations of fortune cookies, that, when opened, reveal whether or not the player won a prize. The outcome of each reveal element may be predetermined, and the game may retrieve information from the server indicating a predetermined sequence of game play as discussed above. In the case of a reveal element game, the predetermined sequence may indicate winnings associated with each of the game instances, the sequence of reveal element selections for each game instance (e.g., wherein prizes are not awarded for particular intermediate indications shown by the selection of a reveal element, but wherein the game experience is still predetermined), any fortunes shown in conjunction with losing reveal elements, and/or an indication of a prize won as a result of selecting particular reveal elements or playing any particular game instance. It should be appreciated that any aspect of game play may be predetermined and associated with the code.

In another example, only the overall outcome is predetermined (e.g., the total winning associated with the ticket), and the sequence of game play may be determined when the game is played. In the example above where the player is indicated as winning $50 over 7 selections, the $50 winnings (and any intermediate losses) may be allocated to the player at any point over the 7 selections. In the case of any other type of game, winnings may be allocated across game instances. In a further example, winnings may be allocated across game instances. For instance, the player may be provided five (5) game instances with each game instance having 7 reveal element selections. Winnings may be distributed over any of the reveal element selections within any particular game instance. Distribution of prizes among game instances/reveal element selections may be determined during game play by the game playing system.

This allocation may be determined by the server, the game software executing on the client, or a combination thereof. Further, the game play may be randomized in that a further play using the same ticket may yield a different sequence of game states leading to the same outcome. For example, in the case of a slot machine game as described above, a player may be indicated as winning $50, but the sequence by which the player attains the $50 winning outcome may be different depending on various factors. Such factors may include a randomization function that determines results of individual game plays (e.g., in the case of a series of reveal element game, the result of reveal element selections for each game instance) or some other function. The series of intermediate outcomes may be stored in a database associated with the server as discussed above with respect to game outcomes. Also, the outcomes may be adjusted using a formula or rule-based approach during execution of the game to increase the game drama and heighten the game playing experience.

According to another aspect of the present invention, a player may purchase a ticket at a point of purchase (e.g., a convenience store) and the indication of a win/no win condition of the ticket is revealed on a different medium. For instance, a player purchases a scratch ticket in a convenience or other type of store. The prize that the player wins is not revealed on the scratch card itself, but rather the prize is revealed through another medium (e.g., on a home computer system, PDA, cell phone, etc.).

For instance, as discussed above, the player may be presented another game (e.g., a reveal element game, a card game, casino game, or any other game) that reveals at least a portion of the prize. The underlying prizes available via the reveals may be predetermined, in that the outcome of the game may be stored in one or more systems. The scratch ticket may reveal different numbers of plays (e.g., game instances or reveal element selections in the case of a reveal element game, a slot-machine type game, or game instances of any other type of game) the player receives.

In one aspect of the present invention, the ticket includes authentication information that is used to obtain the reveals. In one example, the scratch ticket contains a secret key which is used to decrypt the results that are revealed to the player. That is, according to one aspect, it is impossible to determine if and what a particular ticket wins without having possession of the ticket (and therefore the secret key). In another example, the scratch ticket could contain only a portion of the secret key. The other portion of the key may be stored, for example, on a server and retrieved from a database (e.g., file, relational database, etc.) based on, for example, the serial number of the card. Mappings of serial numbers of tickets to encrypted results can be provided to the lottery provider for additional audit control.

Figure 4:
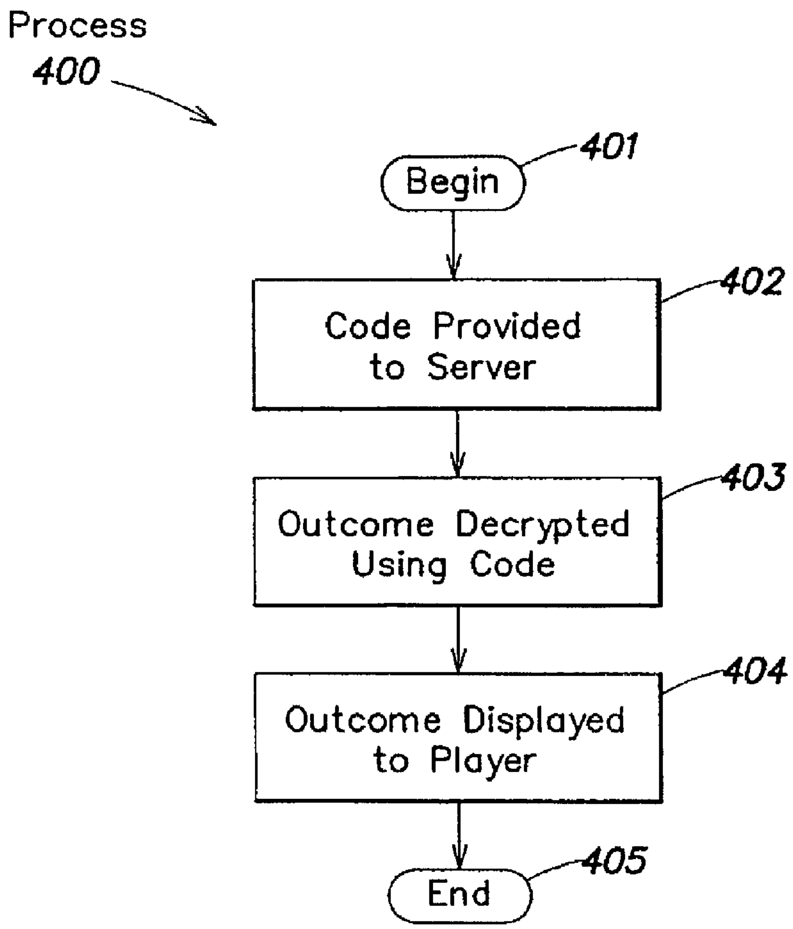
FIG. 4 is a flow chart of a process for conducting a game according to another embodiment of the present invention.

A process for performing secure access to outcomes is shown in FIG. 4. At block 401, process 400 begins. A server (e.g., server 103) may store a number of outcomes in encrypted form, each of which outcomes can be accessed by a respective code. These outcomes may be encrypted, for example, using any encryption method (e.g., symmetric, asymmetric encryption) as is known in the art. At block 402, a code is provided to the server (e.g., server 103).

This code may be, for example, a secret code (e.g., a symmetric key, a private key) printed on a ticket and provided to the server by a user through an interface of a computer system as discussed above. The received code may be transmitted between systems using a secure transmission method (e.g., SSL) as is known in the art. The received code is used at block 403 to decrypt the outcome stored on the server. This code may be any decryption key type that may be used to decode data, and may be of any format or length. The decrypted outcome may then be presented to a player at block 405. The outcome may be displayed using any method. For example, as discussed above, the outcome may be presented through one or more reveals presented to the player during play of an online game. At block 405, process 400 ends.

Another aspect of the present invention relates to a lottery-based software game that can be played over a network, such as the Internet. According to one embodiment, the system includes a purchase of a scratch-based or printed ticket by a player at a point of service (POS). A POS may be, for example, a place at which lottery tickets may be sold, including convenience stores or other locations where lottery products are provided. In an alternative system provided at a casino or other gaming establishment, a ticket may be sold to a player at the casino for play at a later time.

The player receives the ticket at the POS or other location, and proceeds to play a computer-based game at another location to reveal a result (or outcome) of the game. The computer-based game may be, for example, a casino-type game (e.g. slot machine, video poker) or other type of game, including amusement games or games of chance. In the case of the scratch or printed ticket, the result is not apparent to the player until the player plays the computer-based game. This game may be, for example, a software program that is downloaded and played over the Internet. Alternatively, other ways of accessing the online portion of the game may be used (e.g., PDA, cell phone or other method).

The ticket includes a code by which a player gains access to a result stored on a server that stores ticket information and results associated with each ticket. Such information may be predetermined at the time of ticket sale, or the results may not be known until a later time, after the ticket is issued to the player (e.g., in the case of a Keno, bingo, or other drawing-based system). According to one embodiment, the code is an access key (or a portion thereof) that is used to access the result stored on the server. Further, the result (stored in the server) may be encrypted. For example, the code may be a private key or a symmetric key. The key may be transmitted by a client computer system to the server for the purpose of decrypting the result using SSL or any other secure method.

Because the decryption key is stored on the ticket, the gaming system is safer, as a breach of security of either the tickets or the server does not provide access to result information. More particularly, access to the lottery ticket database may not be accomplished without the ticket (used to decrypt the result). Further, the tickets may not be correlated to results without the lottery ticket database (because the results are stored in the database, not on the tickets).

In another example of the system, a portion of the key used to decrypt results of the game is stored on the ticket, and another portion is stored in the database of the server. In this manner, it is assured that possession of either portion of the key may not compromise the results.

However, it should be appreciated that the system does not require SSL or any other encryption/decryption method, a decryption key on the ticket, or the stored result on the server to be encrypted. Rather, the game can be implemented with or without these features. That is, access to the outcome stored at the server may be performed using only the serial number or other ticket identifier printed on the ticket.

The scratch-based or printed ticket also includes a second serial number or other identifier (e.g., an access code) in addition to the serial number or other identifier which is correlated to results on the server. A ticket may include both a serial number and a ticket identifier used by the system. According to one embodiment, it is appreciated that there may be security issues with using the serial number of a printed ticket (as printed on the ticket) to correlate to win outcomes. That is, the lottery provider may not allow any entity outside of the lottery system to have the ability to correlate outcomes to serial numbers. To this end, another identifier (e.g., a separate ticket identifier or access code) may be provided on a ticket to allow the system to index into an outcome database.

In one example system that works in association with a lottery system, outcomes for a game may be predetermined to comply with lottery rules. In this case, outcomes are predetermined and stored in a database. In an alternative environment where results are not permitted to be predetermined (e.g., in a casino), but rather are determined at a later time (e.g., by a drawing or other method), a ticket issued by a system in such an environment may have an associated drawing time when a game may be played.

In the case where the online game system is driven by a Keno game result, each ticket may be associated with a set of numbers in the Keno game, and the result of the Keno game is provided as the result for the online game. In one example, a computer system automatically picks numbers associated with the ticket at the point when the ticket is issued. Thereafter, when the Keno game occurs, the result of the Keno draw is provided to an online game system, which translates the Keno result to a game experience within another game (e.g., a reveal element game, a slot machine game, etc.). It should be appreciated, however, that although the game of Keno may be used to drive an online game experience, other games (e.g., bingo) may be used.

The server (e.g., server 103) may be capable of accepting, from the user, an input of the serial number and decryption key, and in response, providing the results associated with the particular ticket. The result or outcome of the game may be displayed to the player in an interface of the computer system (e.g., a client computer system such as a personal computer (PC)) used to play the computer-based game. For example, the outcome of a series of plays associated with the ticket may be stored in the server, and provided to the client, and the series of outcomes may be presented to the player during play of the computer-based game.

In another embodiment of the system, a payout of the ticket may be encoded on the ticket. For instance, if the ticket is a $5 winner, the amount of the win may be encoded on the ticket. In the case of the casino-based version of the system, the payout may not be stored on the ticket (as the payout is not predetermined), but rather the purchase price of the ticket may be stored on the ticket, or some other identifier of the ticket.

Figure 5:
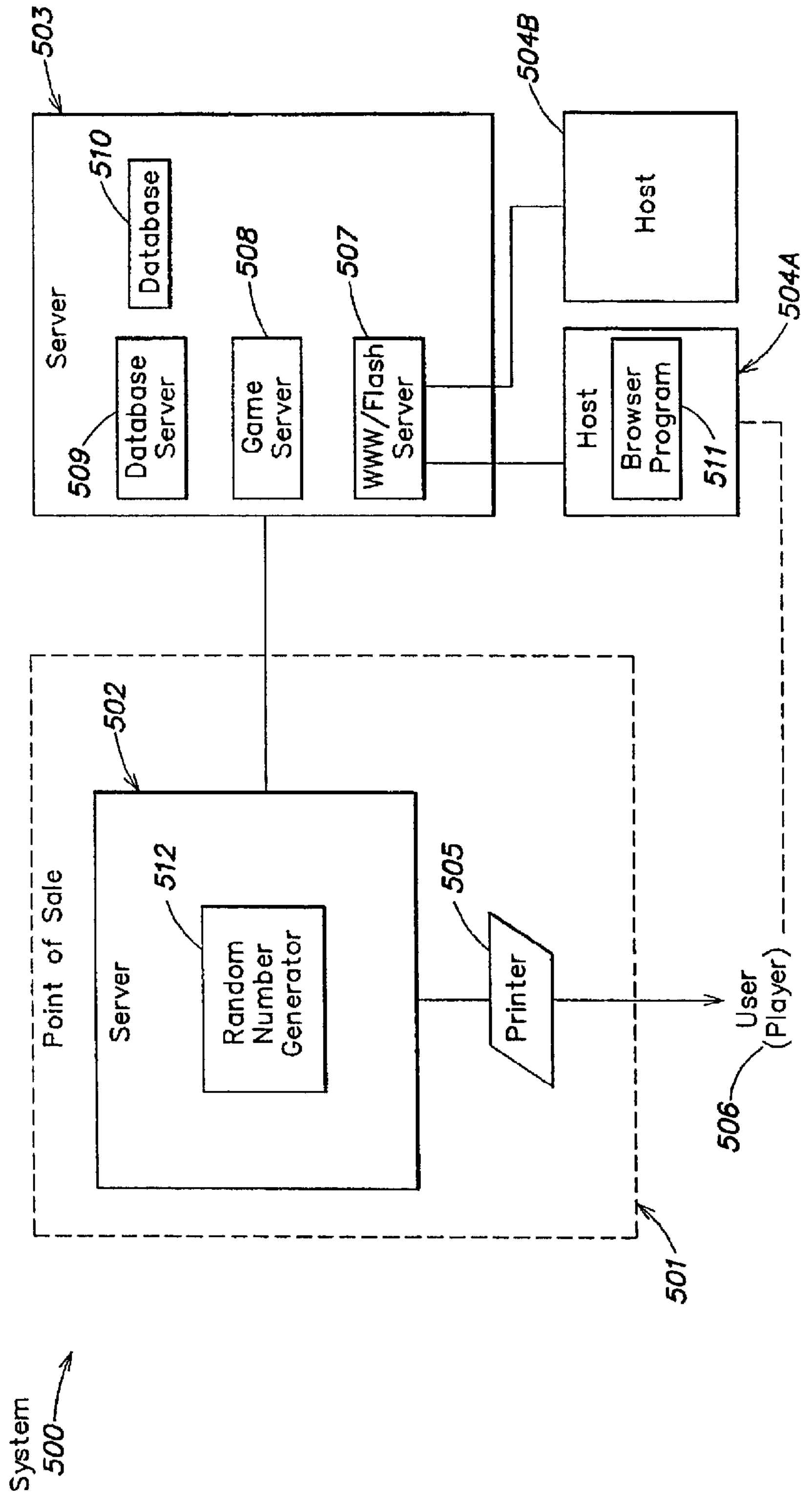
FIG. 5 is a system for conducting a game according to according to one embodiment of the present invention.

As shown in FIG. 5, a system 500 may be provided having more than one server. For instance, a server 502 provided at the point of sale 501 is primarily responsible with issuing tickets to a user/player 506. To this end, server 502 may issue preprinted tickets or may issue tickets printed from an associated printer 505. Such tickets may include one or more identifiers as discussed above with reference to FIG. 2. As discussed, another system such as a Keno or lottery-based system may be used to provide results to an online game system.

In one version of system 500, the win/loss determination of a ticket may be driven by a later-occurring drawing. For example, a Keno-based, bingo-based, or other type lottery draw system may be used wherein the outcome of a particular game is not known until a future time (e.g., when a drawing occurs). In this case, the ticket identifier stored on the ticket may be an access code generated from ticket identifiers in the Keno-based system (e.g., by an intermediate system or the Keno server itself that can translate a Keno ticket identifier into another type of identifier).

Generation of an identifier separate from the Keno ticket identifier may be necessary for security reasons relating to the Keno system. More particularly, access to the Keno ticket identifiers may not be permitted by the system (e.g., the Keno server). In one example, a Keno system translates Keno ticket identifiers into access codes and results that are stored on the game server (e.g., server 503). Thereafter, clients (e.g., hosts 504A, 504B) access results stored on the server based on their respective access codes.

As discussed above, one or more hosts 504A, 504B (e.g., general purpose computer systems) may communicate with a server 503 over a network for the purpose of conducting a game. In one example, a host 504A renders a browser window by executing a browser program (e.g., the Internet Explorer browser program available from the Microsoft Corporation). A user/player 506 enters a URL address specified by an issued ticket in a window of the browser interface, and is directed to a website associated with server 503. This website may be rendered by, for example, a WWW server process (e.g., server 507) associated with server 503.

Player 506 may be instructed to enter an access code (and/or any other required information) to access one or more games in an interface presented through the browser. As discussed, server 503 may validate the received access code, and provide any results stored in a database associated with server 510. Once validated by server 503, the user may be permitted to play one or more games. These game may be, for example, be programmed using one or more programming languages (e.g., Macromedia Flash) and may be downloaded to host 504A and executed.

Also, outcomes associated with any games may be downloaded prior to game play. As discussed, examples of games include those that may be of the lottery-type (e.g., having a predetermined outcome) and those that are casino-based (e.g., having an outcome that is not determined at the time of sale of the ticket). In the case where a later drawing affects an outcome, a player may not be permitted to play the game until the drawing occurs (and until results are available at server 503). In the case of a drawing that affects outcomes, drawing results can be communicated from server 502 to server 503. In addition, server 502 may maintain a mapping from a ticket identifier (e.g., a serial number) to an access code provided on the ticket, and provide a mapping of outcome to access code when the drawing occurs. As discussed, such outcome information may be maintained in a database 510 associated with server 503 and may be accessed through a database server process 509.

As discussed, the payout of the lottery ticket may be displayed to a player in a number of ways. For instance, the payout of the ticket may be presented to the player through one or more reveals presented to a player during one or more plays of an online game.

For instance, in the case of a slot machine game, a player may be permitted, with the issue of a single scratch or printed ticket, a series of spins of the slot machine. The slot machine may, as the result of each of the spins, produce results that contribute to the overall payout to the player. For instance, after a single spin, a player may be presented an indication that he/she has won $5. The payout to the player as provided from the server database may be, for the series of spins, $50 overall, with particular outcomes for each spin. Additional spin results may provide the additional $45 that the player will receive. Additional spins may add, subtract, or have no affect on the contribution to the outcome of the game. These results of each spin of the slot machine game may be stored in the database of the server indexed by the ticket identifier, or may be randomly determined by the game program that renders the game. Further, as discussed above, the results of each spin may be "scripted" such that the game experience is more exciting to the player.

For example, in the case where the results of each spin are stored on the server, the series of results may be downloaded to the client at the beginning of the game as a series of entries, and the client may reveal each result as the player progresses through the series of spins. In the random method, results for each individual spin are not predetermined, but rather are determined by the client in a random manner. For instance, the actual outcomes of each spin may be randomly chosen among the possible combination of outcomes that may produce the required payout. In either case, the outcomes for each spin of the slot machine game is not stored on the ticket, but rather is stored at the server and downloaded just prior or during game play, or is determined randomly by the client. Alternatively, the client may determine the game experience based on a predetermined set of rules or formulas that, when an overall outcome is provided, allows the client to determine intermediate outcomes in a dynamic way.

In the case of a reveal element game, the actual reveal element selections may be scripted so as to create more excitement for the player. For instance, reveal element selection results may be presented in a particular order, making the player believe they are close to obtaining a particular prize. Further, the player may play multiple game instances of a reveal element game, and the game experience may be scripted among the multiple game instances so as to increase the excitement of play. In one example, the pay table is increased with each successive reveal element game instance, and therefore, player excitement is increased as play progresses.

Because the game play and outcome are scripted, a player may also not play the game (and possible secondary games) to actually win. A player may purchase a ticket, wait until the ticket may be redeemed, and go to a POS to find out (and if necessary, receive) his/her winnings. A ticket may be allowed to be redeemed after a predetermined period of time after the drawing independent of whether the player has played the game. A ticket may be able to be redeemed after a predetermined period of time, from almost immediately to seconds to days or any predetermined time. For tickets with results dependent upon results of a particular Keno game or other event, the ticket may not be redeemed until after the event has passed.

Finally, after play of the online game, the player is permitted to validate the ticket at any POS location (e.g., 501 (for example, a lottery agent, casino, or other gaming establishment) to redeem his/her winnings as indicated during the online portion of the game. According to one embodiment, players are permitted to redeem their winnings only after playing the online portion of the game. The player, by playing the online portion of the game, sets status information at the server (e.g., server 503). When the player attempts to redeem the ticket at the POS (e.g., 501), the status information may be checked, and the player is permitted to redeem his/her winnings. To this end, server 503 may communicate information back to server 502 relating to game play.

For instance, server 503 may collect information that indicates the sequence of game play performed at the client, and other player tracking information. In one example, tickets may be associated with a particular player, and the player may be awarded loyalty points or other credit for playing the game.

Taking a reveal element game, a player is issued a ticket at a POS to play one or more instances (e.g., reveal element selections) of the reveal element game. The ticket indicates an access code, and the player uses this access code to gain access to the system (e.g., from a host coupled to server 503 through the Internet). The player enters the access code in a user interface, and, once validated, is permitted to play the reveal element game. Optionally, the player is permitted to play, based on a single access code (and ticket), any one of a number of games available from server 503. Such an option may allow a player to play different games for each game instance associated with the ticket.

Figure 6:
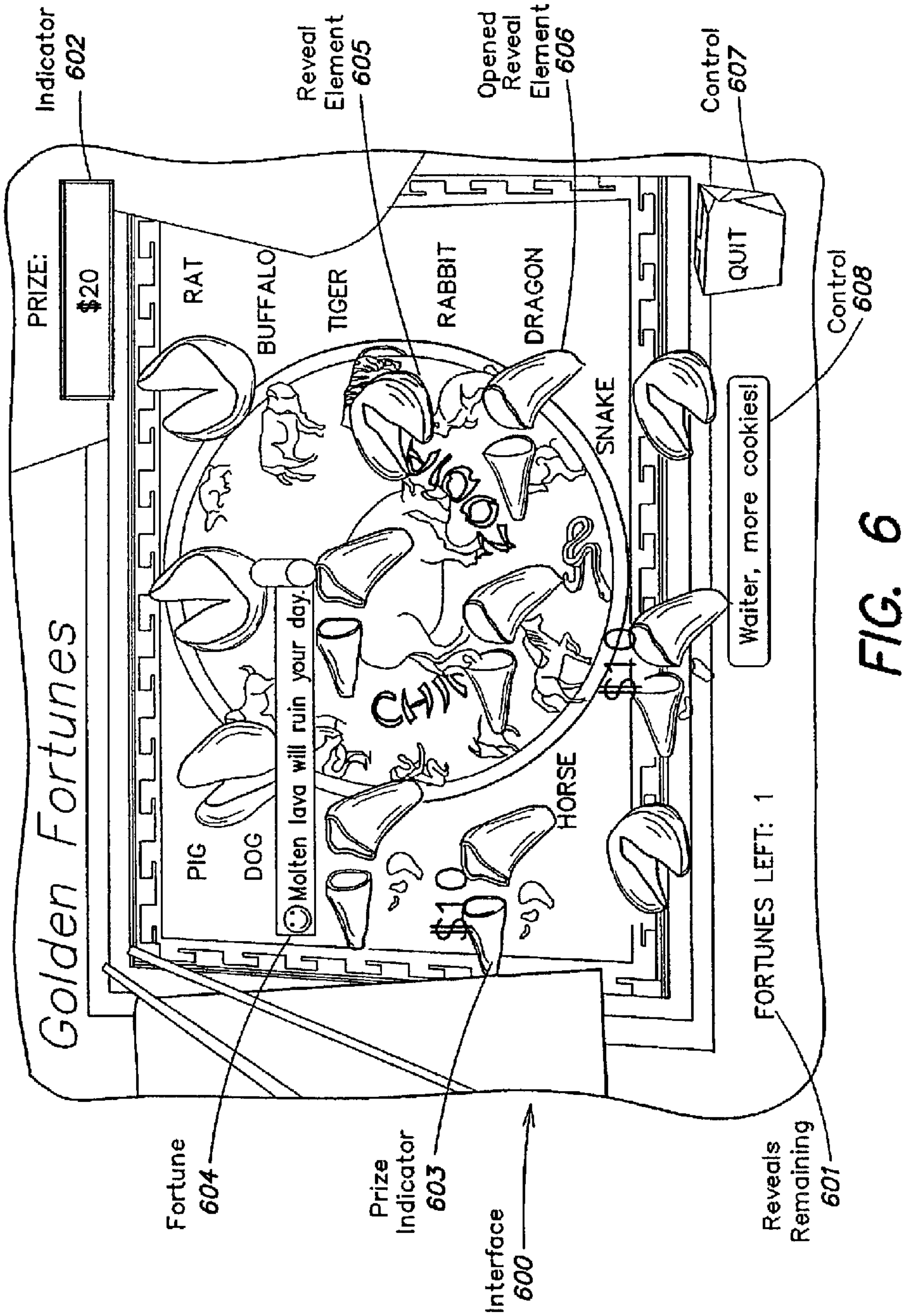
FIG. 6 is a game interface according to one embodiment of the present invention.

FIG. 6 shows an example game interface 600 according to one embodiment of the present invention. According to one embodiment, the game includes a reveal element-type game. The reveal element-type game may, according to one embodiment, have one or more prizes associated with reveal elements that are selected by a player. In the example shown, the reveal elements are fortune cookies that, when selected (e.g., opened) by the player, an indication of a win/loss is revealed to the player. However, although a fortune cookie may be used as the element type, it should be appreciated that other types of reveal elements may be used, having different formats, and the invention is not limited to any particular reveal element game.

According to one embodiment of the present invention, the reveal element-type game is presented to the player by a computer system in an interface 600. In particular, in a display of a computer system upon which the game is played, one or more reveal element representations (e.g., element 605) may be rendered in interface 600, with each reveal element having a prize associated with it.

According to one embodiment, the overall outcome of the game may be predetermined (and therefore, fixed), and therefore, it is appreciated that the player can arbitrarily choose reveal elements, but the game must provide the same overall fixed outcome. To this end, there may not be a fixed association between particular representations of reveal elements (e.g., fortune cookies) and prizes, but rather, there may be a fixed association between the selection number of the reveal element being selected. For instance, in the case of a fortune cookie game, a particular fortune cookie does not have a fixed result associated with the cookie, but rather, if the cookie is selected at a particular point in the game (e.g., the third cookie selected), the result is associated with that particular point (e.g., the third selection) rather than the actual reveal element. In this example, any cookie may be selected third causing the associated prize to be revealed (or not).

A reveal element may or may not have any indicia associated with its representation to the player. In one example, prizes, word phrases, or other indications may be presented within each section of a representation of a reveal element. More particularly, each section may include indicia (e.g., indicia 603) that indicates a potential prize and/or word phrases or other indicia associated with a second level game (e.g., a fortune game, a trivia game, etc.). The indicia may be, for example, characters, items, or any other type of elements suitable for use in a reveal element or similar game. In the case where the reveal element is a representation of a fortune cookie, there may be no indicia indicated in the representation presented to the player.

Entries of a pay table may be associated with the selection of a reveal element. According to one embodiment, it is appreciated that there may be more entries in the pay table than there are potential reveal elements that can be displayed to the player. Thus, to make all pay table entries possible, certain pay table entries may not be available in particular instances of the reveal element game, or the available entries may be adjusted to heighten the game experience (e.g., higher payout amounts for later instances of the reveal element). Also, certain entries of the pay table may be omitted, if the result of the overall game is predetermined (or determined prior to game activation), and therefore, those pay table entries may be omitted.

A reveal element game is played generally by selecting a reveal element, and the player winning any prize indicated by the reveal element (e.g., reveal element 605). In such a reveal element game, a participant wins the prize indicated, but as discussed above, one or more losing reveal elements (or their selection number) may indicate a fortune (e.g., fortune 604) to be presented to the player. When the player selects one of these losing reveal elements, a second level game is initiated, such as a fortune game. In one example, when the player selects a losing fortune cookie element, a fortune is shown to the player. In this manner, entertainment of the player is increased over that of a simple indication of a loss. To this end, the game program may present to the player, a window indicating the player's fortune (e.g., fortune 604). The window may be, for example, a popup window showing fortune information.

The fortune information may be, for example, text information for entertainment purposes. In the example fortune 604, the fortune includes the sentence "Molten lava will ruin your day." Fortune information may include any information suitable for a fortune, such as lucky numbers, symbols, etc., and the invention is not limited to any particular fortune information. Fortune information may be stored on a server (e.g., server 103) and updated periodically to increase the quality of the game-playing experience, and maintain interest.

The reveal element game interface 600 may also include a control which may be any type of control (e.g., a button, lever, etc.) that, when activated, causes the reveal element to be selected. Such a control may be selected by the player using a selection method (e.g., keyboard entry, mouse, etc.) on the computer system upon which the player plays the game.

Further, interface 600 may also include an indicator 601 that indicates the remaining selections of the reveal element. As discussed, the player may be allowed a finite number of reveal element selections to win any particular reveal element game. Further, interface 600 may include a prize indication 602 that shows the prizes currently won. In another example, interface 600 may include an indication that the current reveal element selection is a winning reveal element selection, and that the player wins a prize (e.g., indication 603).

In another example, the game program may include a mode wherein reveal elements are automatically revealed (e.g., in succession), or may include any number of indications or controls associated with reveal elements or interface 600. The type and layout of the reveal element is not limited to the type and layout shown in FIG. 6. Rather, it should be appreciated that the reveal element may be any type and layout, and the invention is not limited to any particular reveal element card type or layout.

The reveal element game ends when the player exhausts the allotted reveal element selections (e.g., seven (7) reveal element selections) for a particular game instance, and/or plays the last allotted game instance of the reveal element game (or any other game permitted by the game system). In one example, the player may be presented fourteen (14) reveal elements, of which seven may be selected. In another example, interface 600 may include a control 608 that, when selected by the player, causes the current display to be refreshed with unopened reveal elements. For instance, control 608 may cause the current screen of opened (and unopened) fortune cookies to be replaced by a screen of unopened cookies. However, as it is appreciated that there may not be a fixed association between particular reveal elements and any prizes, the screen may be refreshed in this manner without changing the outcome associated with opening particular reveal elements (e.g., particular cookies).

As an additional option, a player may bypass play of the reveal element game by selecting control 607 within interface 600. More particularly, interface 600 may also include a control 607 that quits the game and reveals any prizes won by the player. Selection of element 607 may cause the reveal element game to end and may allow the player to progress to another game (e.g., a reveal element game or other type of game). The result of any particular instance of a reveal element game may be associated with a prize and then revealed to the player at the end of any particular reveal element game instance.

After play of any particular reveal element game, game play is returned to another instance of the game (e.g., the reveal element game). The player may, however, choose to play a different game (e.g., a card game or other game) at the conclusion of any particular game instance. In the case of the reveal element game, a game instance may be concluded. According to another embodiment, the play of each game instance is independent of all other game instances. According to another embodiment, the outcome of a particular game instance is predetermined.

According to one aspect of the present invention, it is realized that the time at which tickets are activated (and therefore, may be played) is important. In the case of a casino-based game, where tickets are issued at the casino, it may be beneficial to include a delay between the purchase of a ticket and a possible redemption of the ticket so that the game play associated with the ticket does not compete against other games offered by the casino (e.g., floor games). For example, in the case of a reveal element game, it may be preferable that such a game be activated after the player leaves the casino, or otherwise is not playable while in the casino so as not to compete with other types of games offered by the casino.

Further, another benefit of introducing a delay between ticket issuance and activation includes increasing the likelihood that the player plays the game at another location (e.g., at home), requiring the return of the player to the ticket redemption location to redeem his/her winnings. Because the player needs to return to the redemption location (which may be a casino), the possibility that the player will purchase additional tickets or play other types of games offered at the redemption location is increased.

According to one aspect of the present invention, the result of each game instance (e.g., a reveal element game result) may be predetermined, whereas the result of reveal element selection or other game play element is determined using some random number generator (or RNG). In this manner, the player is provided a predetermined result, but the game play that occurs in the first level game is a random number-generated experience which is more similar to actual play in a casino or other online gaming experience. However, because it may be desired to increase the drama of any particular reveal element game, it may be beneficial to provide a predetermined (or scripted) outcome for at least a portion of the reveal element game (e.g., the result of a reveal element selection) so as to provide an increased game experience for the player.

According to one embodiment, a player is only permitted to play one instance of the reveal element game. In this case, the player uses provided reveal element selections to achieve the result of the reveal element game, and when completed, the player is provided a single result associated with the game. In another example, any reveal element selections remaining after the player wins a prize are lost. After play of the reveal element game, the online portion of the game is over.

Alternatively, the player may be permitted to play further instances of the reveal element game, with each level of the reveal element game leading to a revealing of prizes. These intermediate prize amounts that are revealed with each instance of the reveal element game, as discussed above, may be stored in a database of the server, and provided to the client prior to or during game play. Alternatively, intermediate prize amounts may be determined at the client in a random manner (e.g., by randomly selecting a possible combination of intermediate prize amounts that total the overall prize awarded to the player). In another example, a game may be determined dynamically by the game system or client based on one or more rules. These rules may be tailored so that the overall result is revealed by the game system in an interesting way.

For instance, the ticket may have an overall prize value of $50, and the prize awarded at each instance of the reveal element game may accumulate to form the $50 prize. There may be a finite number of combinations of reveals based on the number of game instances to achieve a $50 prize, and the actual game experience presented to the player may be a random selection of the finite outcomes. In any case, the result of each game instance and/or individual reveals is either stored at the server or is determined randomly or dynamically by the client as discussed above.

According to one aspect of the present invention, the prizes awarded for particular selections in the reveal element game may be changed according to the reveal element selection number so as to increase the game "drama" to maintain player interest. For instance, as the reveal element selection number is increased, the prize awarded for a particular selection number may also increase. In another example, particular payouts may also be increased or activated based on the reveal element selection number or number of reveal element game instance, providing an increased level of excitement for the player.

According to one embodiment of the present invention, a reveal element game is conducted that may include the following additional aspects, either alone or in combination:

- Each user receives five (5) plays (or instances) of a reveal element game at the start of the game.
- In another alternative, each player is provided seven (7) reveal element selections of a reveal element for each reveal element game instance. In one example, the pay table is adjusted upward for each successive game instance played to create more interest to the player. In another example, the pay table is adjusted with successive reveal element selection numbers to create more interest within each game instance.
- To begin, the user selects a start button presented in an interface of the game.
- The player is presented a display having a number of reveal elements (e.g., fortune cookies as discussed above). In one example, 14 reveal elements (e.g., fortune cookies) are presented to the player.
- Each reveal element includes an indication of a prize or is a losing element. In one example, a losing element may be associated with a second level game (e.g., a fortune game).
- In the case of a fortune cookie game, each reveal element is presented initially as an unopened fortune cookie. When the reveal element is selected, the representation of the fortune cookie is changed to an opened fortune cookie (e.g., opened reveal element 606), and an indication of a prize (e.g., prize indicator 603) is presented to the player.
- In another example of the fortune cookie game, one or more losing elements are associated with a second level game such as a fortune game. When losing elements are opened, the player's fortune is revealed to him/her within interface 600.
- The player's fortune is revealed on a scroll-like paper representation.

- A cookie's scroll representation remains on the display until the next cookie is selected.
- A fortune may be revealed in addition to winning a prize.
- At any point during the selection of cookies, the player can select control 608 to receive a screen of unopened cookies.
- Selecting control 608 does not change the outcome of the game.
- The player is presented a control, that, when selected by the player, allows the player to return to the reveal element to perform any remaining reveal element selections. In one example, the player may select another reveal element (e.g., a cookie).
- At the conclusion of the game (e.g., a game instance or series of game instances associated with a ticket), the player is presented an indication that the game is over and a report of any prizes won by the player.
- The initial ticket issued may be used at a redemption center for claiming any awarded prize(s).
- In another example, the result of any reveal element game may be determined by an RNG and odds at the moment of play, or may be determined at the time that a lottery ticket is printed.
- The overall result (e.g., payout) of purchasing a ticket may be predetermined (as in a scratch or other type of instant lottery game) at the point of ticket issuance or may be determined by a later event (such as a lottery, Keno, or bingo draw).

According to another embodiment of the present invention, a reveal element game is conducted that may permit a player to predict one or more characteristics of the reveal game. For example, the reveal game may permit a prediction of a result of a reveal element being displayed to the player.

Figure 7:
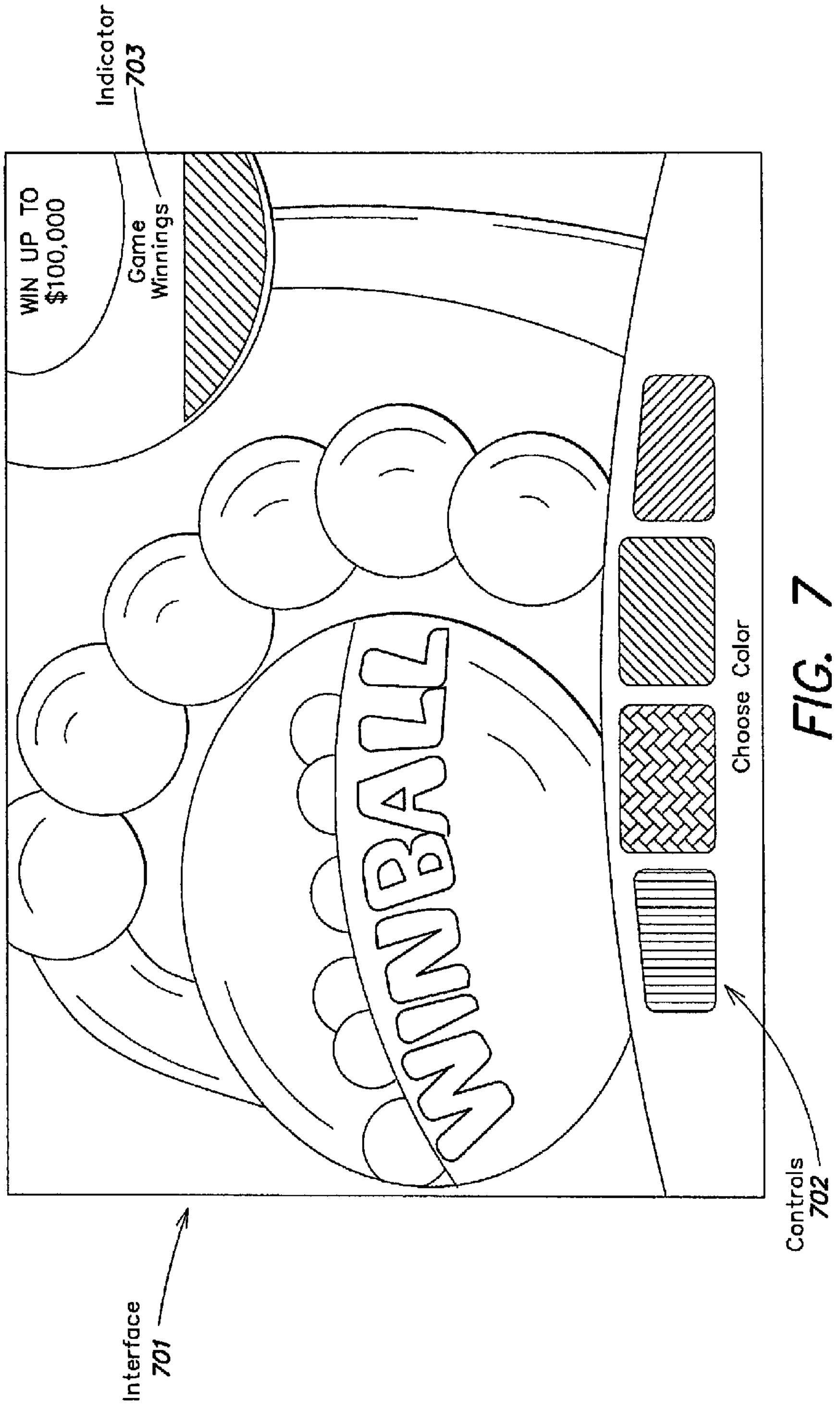
FIG. 7 is a game interface according to another embodiment of the present invention.

FIG. 7 shows an interface 701 of one such game format according to one embodiment of the present invention. In the example game shown, a player is permitted to predict the outcome of a reveal game by predicting characteristics of elements that are revealed to the player. In the example, the player predicts a color of reveal elements (e.g., balls) that will be drawn by a game-playing computer system. The player may select a control (e.g., one of controls 702) to predict which color he/she believes will be drawn most frequently. After the prediction is made, a set of balls (e.g., six balls) may be drawn and displayed to the player within interface 701. The balls may be drawn one at a time, and drawn in an order to maintain player interest or otherwise create a building of suspense for the player.

Figure 8:
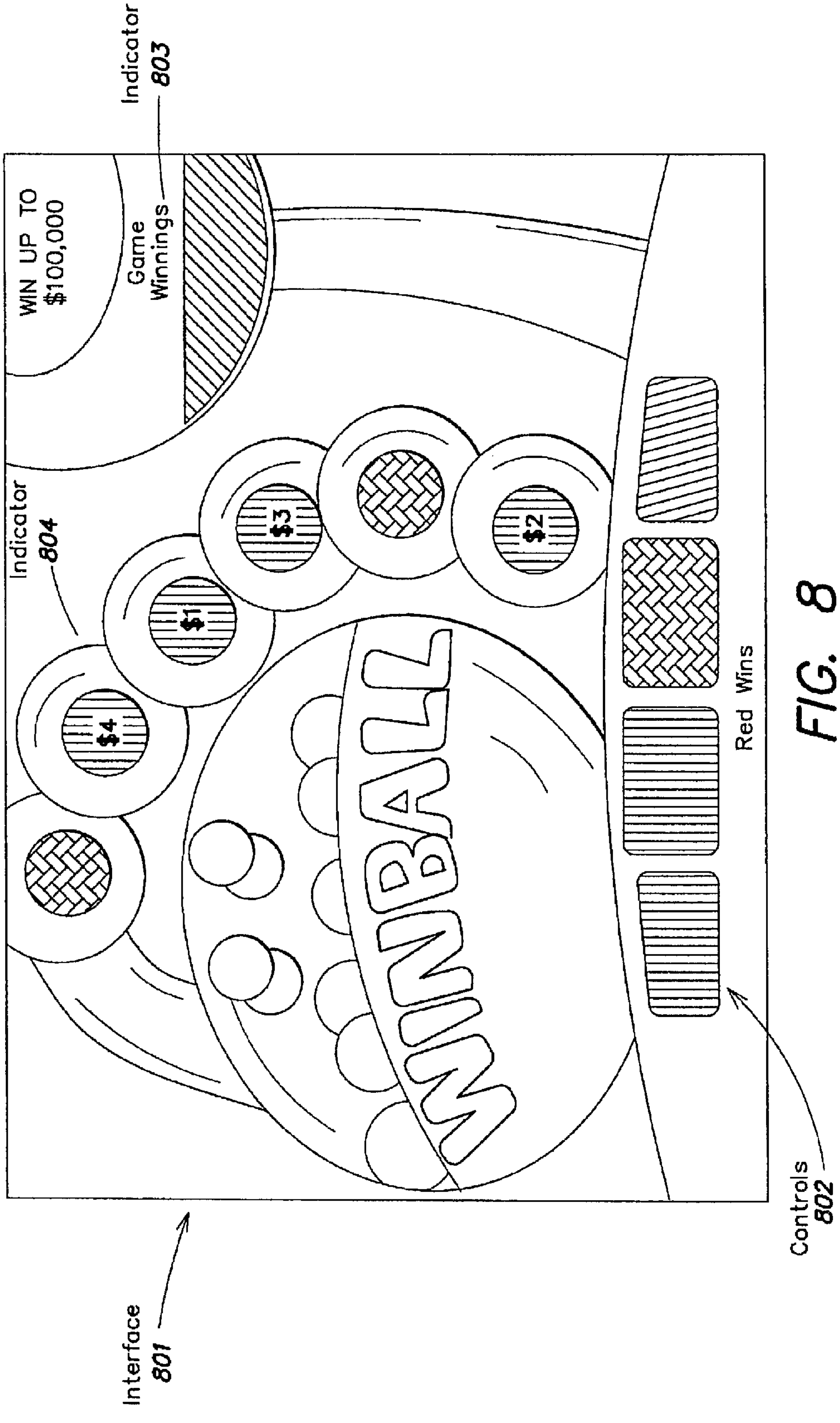
FIG. 8 is a game interface according to another embodiment of the present invention.

As shown in FIG. 8, an interface 801 may be presented that displays one or more indicators 804 of a prize won by the player. In the example show, the player may have selected (using controls 802) that the red colored balls may be selected most often, and the four red balls drawn may each be indicated as winning a prize. The total of any prize winnings may be shown to the player by an indicator (e.g., indicator 803) of display 801. In a different example, the player may have chosen the color yellow which does not correspond to a winning outcome, as the yellow balls are not the most frequently-occurring element. To this end, the player may be displayed an indication that the player did not win a prize. According to another embodiment of the present invention, the game-playing computer may determine a ball drawing that indicates that the player is close to winning a prize (e.g., a near miss) to encourage the player to continue playing the game.

As it can be appreciated, the player's predictions do not influence the outcome of the prediction game according to one embodiment of the invention. Rather, in one example game format, the prediction game reveals the result which, according to one embodiment, is determined prior to game play, and thus the drawn balls displayed to the player merely reflect the predetermined result. However, the player feels that their prediction influences the outcome, and thus may continue playing the game as a result.

In yet another example game format, the player may be permitted to select a plurality of reveal elements until a prize is won (or not). In one particular game format, the player may be presented a set of elements within an interface of a game-playing computer, and the player is permitted to select any of the set of elements until the player is displayed a predetermined number of matching elements. Each element displayed to the player may correspond to a prize (or not), and the identity of the element type is hidden from the player until the element is selected in the interface.

Figure 9:
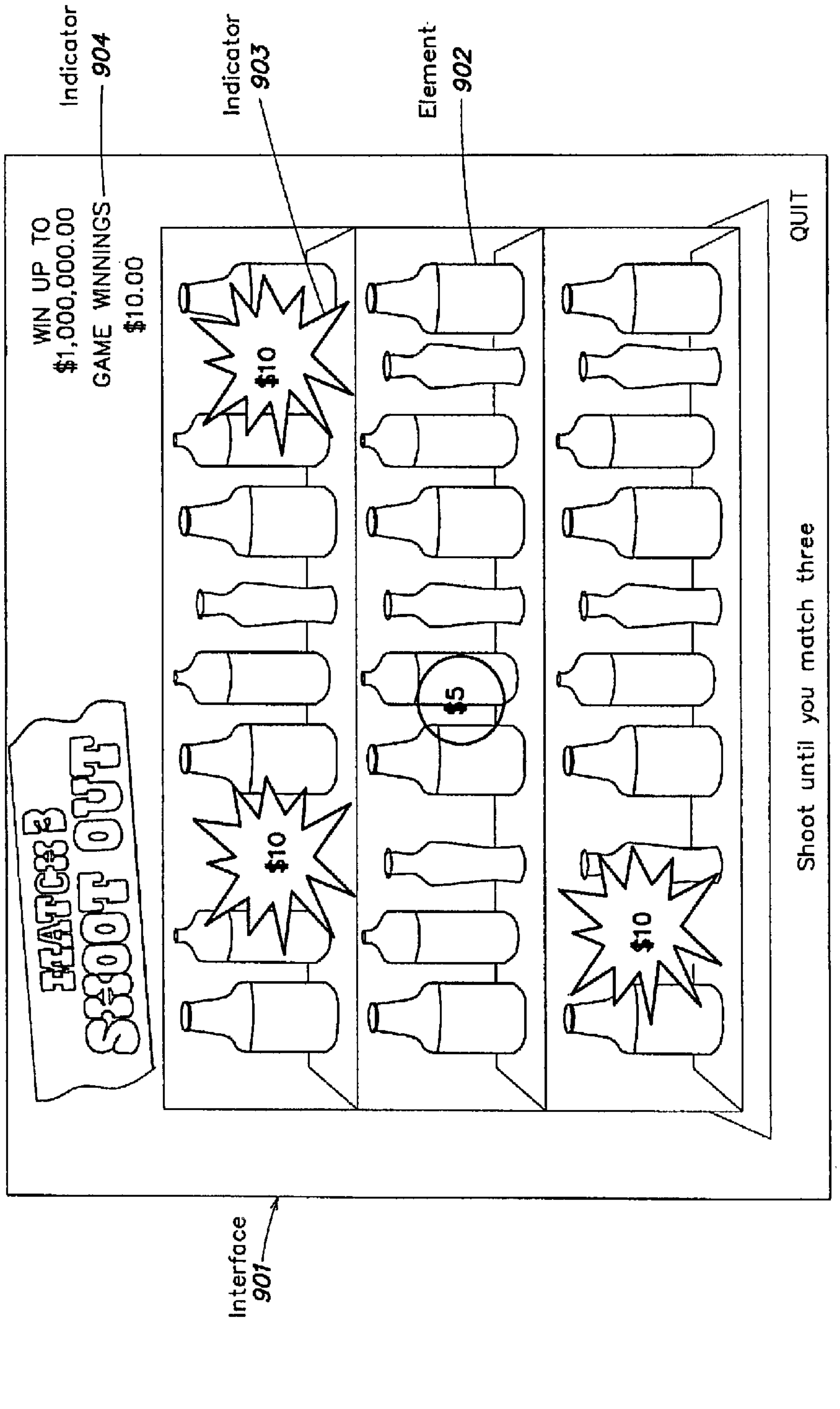
FIG. 9 is a game interface according to another embodiment of the present invention.

FIG. 9 shows one example interface 901 of one such game format according to one embodiment of the present invention. In the example game shown, a player is permitted to "shoot" one or more game elements (e.g., element 902) which correspond to a hidden indication (e.g., indicator 903). The player shoots elements by selecting them within the game interface (e.g., by operating a pointing device such as a mouse, touchpad, or other device). The player continues to select elements, and when the player selects the predetermined number of a particular type of element, the player wins the prize indicated by the selected element.

For instance, in the example shown, the player selects bottle elements from a group of bottle elements appearing on a number of shelves. When a bottle is selected, an icon or any type of indicia is revealed to the player. The indicia may indicate to the player a potential prize that can be won. According to another embodiment, the icon or other indicia, if combined with other icons (either the same or different icons) matches an entry in a paytable, the player may be indicated as winning a prize corresponding to the paytable entry. Although according to one embodiment of the invention, the selected elements may be bottle elements, it should be appreciated that the elements may be any type of element, and have any characteristic that, when matched by the game-playing computer, indicates that the player wins a prize.

As it can be appreciated, the player's selection of particular elements do not influence the outcome of the game according to one embodiment of the invention. Rather, in one example game format, the game reveals the result which, according to one embodiment, is determined prior to game play, and thus the hidden indicia (and combination thereof) displayed to the player merely reflect the predetermined result. However, the player feels that their selections of particular elements influence the outcome, and thus may continue playing the game as a result.

In one example game format, once the player achieves three of the same or similar element, the player wins the prize indicated. Game winnings for a particular game instance may be shown to the player in an indicator (e.g., indicator 904) of interface 901. The player may not necessarily receive a prize and, according to one embodiment, the game-playing computer may display a result that is close to winning (e.g., by showing two elements having a large prize) to encourage the player to continue playing.

Having thus described several aspects of at least one embodiment of this invention, it is to be appreciated that various alterations, modifications and improvements will readily occur to those skilled in the art. Such alterations, modifications, and improvements are intended to be part of this disclosure, and are intended to be within the spirit and scope of the invention. Accordingly, the foregoing description is by way of example only.

What is claimed is:

1. A method for playing a game of chance comprising acts of:

issuing, by a computer system, a ticket to a player, the ticket including a code printed on a surface of the ticket; and providing, by the computer system, for the player to play a game on different medium than the issued ticket, the game comprising a plurality of game elements, the plurality of game elements each comprising an identifiable characteristic, wherein at least two of the plurality of game elements share an identical identifiable characteristic, wherein the code is used to gain access to obtain at least one result of the game of chance, wherein the act of providing includes acts of:

requiring the player to predict a most frequently occurring identical identifiable characteristic amongst the plurality of game elements; and displaying to the player, in response to the prediction, the at least one result of the game of chance, by a user interface, such that if the player predicts the identical identifiable characteristic that occurs the most amongst all identifiable characteristics present in the result of the game of chance, the player wins.

2. The method according to claim 1, further comprising an act of determining a game outcome that corresponds to the at least one result of the game of chance.

3. The method according to claim 1, wherein the act of permitting includes an act of permitting the player to predict a result of a drawing of a plurality of game elements.

4. The method according to claim 3, wherein the act of permitting the player to predict a result of a drawing of a plurality of game elements includes an act of permitting the player to predict a most frequently drawn identifiable characteristic of the plurality of drawn game elements.

5. The method according to claim 4, wherein the plurality of drawn game elements includes a plurality of drawn balls, and the method further comprises an act of permitting the player to predict the most frequently drawn identifiable characteristic based on indicia associated with the balls.

6. The method according to claim 5, further comprising an act of determining the drawing of the plurality of game elements that corresponds to the at least one result.

7. The method according to claim 1, wherein the identifiable characteristic includes at least one of color, size, shape, or form.

8. The method according to claim 1, wherein the act of permitting the player to predict a result of at least one game element includes an act of permitting the player to predict a result of a drawing of the at least one game element.

9. The method according to claim 1, further comprising an act of storing, on a server, the at least one result of the game of chance.

10. The method according to claim 1, wherein a prize total associated with the ticket is determined after the ticket is issued to the player.

11. The method according to claim 10, further comprising an act of determining an outcome associated with the ticket based on a drawing.

12. The method according to claim 11, further comprising an act of permitting the player to play the game in response to the act of determining the outcome.

13. The method according to claim 1, wherein a prize total associated with the ticket is determined prior to issuing the ticket to the player.

14. The method according to claim 1, wherein the act of issuing a ticket includes issuing at least one of a lottery ticket, a printed ticket, a scratch ticket, or a pull-tab ticket.

15. The method according to claim 1, wherein the act of providing further comprises an act of providing a computer-based game which the player plays the game to reveal the at least one result of the game of chance.

16. The method according to claim 1, wherein a selection of at least one reveal element in the game is determined by a random number generator.

17. The method according to claim 16, wherein the result of the at least one reveal element selection in the game reveals a prize won by the player.

18. The method according to claim 1, wherein the game is a computer-based game including a reveal element that, when selected by the player, causes a game-playing computer to display one or more prizes awarded to the player.

19. The method according to claim 18, further comprising an act of providing a pay table, the pay table having a plurality of entries distributed among one or more reveal elements.

20. The method according to claim 19, wherein the plurality of entries of the pay table are distributed among a plurality of instances of the game.

21. The method according to claim 1, wherein a prize total associated with the ticket is predetermined.

22. The method according to claim 21, wherein a sequence of results revealed to the player is predetermined.

23. The method according to claim 21, wherein a sequence of results revealed to the player is randomly determined by the client.

24. The method according to claim 22, wherein the sequence of results is stored in a database of a server.

* * * * *